United States Patent
Huber et al.

(10) Patent No.: US 10,338,896 B2
(45) Date of Patent: *Jul. 2, 2019

(54) SYSTEMS AND METHODS FOR DEVELOPING AND USING REAL-TIME DATA APPLICATIONS

(71) Applicant: PTC INC., Needham, MA (US)

(72) Inventors: Philip J. Huber, Newport Beach, CA (US); Lawrence Fan, Irvine, CA (US); Samuel T. Malapas, Needham, MA (US); Brandon Hahr, Irvine, CA (US); Rick Bullotta, Phoenixville, PA (US)

(73) Assignee: PTC Inc., Boston, MA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/303,457

(22) PCT Filed: Mar. 20, 2015

(86) PCT No.: PCT/US2015/021894
§ 371 (c)(1),
(2) Date: Oct. 11, 2016

(87) PCT Pub. No.: WO2015/143416
PCT Pub. Date: Sep. 24, 2015

(65) Prior Publication Data
US 2017/0039038 A1 Feb. 9, 2017

Related U.S. Application Data

(63) Continuation-in-part of application No. 14/222,166, filed on Mar. 21, 2014, and a continuation-in-part of
(Continued)

(51) Int. Cl.
G06F 9/44 (2018.01)
G06F 8/34 (2018.01)
(Continued)

(52) U.S. Cl.
CPC ............... *G06F 8/34* (2013.01); *G06F 9/452* (2018.02); *G06F 9/466* (2013.01);
(Continued)

(58) Field of Classification Search
CPC ........................................................ G06F 8/34
(Continued)

(56) References Cited

U.S. PATENT DOCUMENTS 3,656,112 A 4/1972 Paull
3,916,412 A 10/1975 Amoroso, Jr.
(Continued)

FOREIGN PATENT DOCUMENTS

EP 0497010 A2 8/1992
EP 1187015 A2 3/2002
(Continued)

OTHER PUBLICATIONS

"WebDSL a Domain-Specific Language for Dynamic Web Applications"—D.M. Groenewegen, Z. Hemel, L.C.L. Kats, E. Visser; Software Engineering Research Group Department of Software Technology Faculty of Electrical Engineering, Mathematics and Computer Science—Netherlands—Oopsla 2008.*
(Continued)

*Primary Examiner* — Francisco J Aponte
(74) *Attorney, Agent, or Firm* — Meunier Carlin & Curfman LLC

(57) ABSTRACT

Methods and systems herein employ graphical elements as a coding basis within a development platform to develop Web applications that access and aggregate real-time data of connected devices. The development platform includes testing and development functions to simplify the development of mashup web applications. In one aspect, the platform causes updates of the client-side applications, and the real-time data to be received at each test device with a save action
(Continued)

of the development workspace. In another aspect, the platform inserts code to enable caching operations at the client-side applications, based on associative linking of the graphical objects during development. In another aspect, the platform employs multiple-level hierarchical real-time data to enable the client-side applications to maintain client-side cursors of the last presentation state of the data upon an update of the applications.

20 Claims, 15 Drawing Sheets

Related U.S. Application Data application No. 14/222,276, filed on Mar. 21, 2014, now Pat. No. 9,467,533, and a continuation-in-part of application No. 14/222,138, filed on Mar. 21, 2014.

(51) Int. Cl.
  *G06F 9/451* (2018.01)
  *G06F 9/46* (2006.01)
  *G06F 11/36* (2006.01)
  *G06F 11/30* (2006.01)

(52) U.S. Cl.
  CPC ...... *G06F 11/3006* (2013.01); *G06F 11/3072* (2013.01); *G06F 11/3664* (2013.01)

(58) Field of Classification Search
  USPC .......................................................... 717/109
  See application file for complete search history.

(56) References Cited

U.S. PATENT DOCUMENTS

| | | | |
|---|---|---|---|
| 3,983,484 A | 9/1976 | Hodama | |
| 4,063,173 A | 12/1977 | Nelson et al. | |
| 4,103,250 A | 7/1978 | Jackson | |
| 4,134,068 A | 1/1979 | Richardson | |
| 4,216,546 A | 8/1980 | Litt | |
| 4,554,668 A | 11/1985 | Denman et al. | |
| 4,601,059 A | 7/1986 | Gammenthaler | |
| 4,680,582 A | 7/1987 | Mejia | |
| 4,704,585 A | 11/1987 | Lind | |
| 4,887,204 A | 12/1989 | Johnson et al. | |
| 4,979,170 A | 12/1990 | Gilhousen et al. | |
| 5,113,416 A | 5/1992 | Lindell | |
| 5,134,615 A | 7/1992 | Freeburg et al. | |
| 5,159,704 A | 10/1992 | Pirolli et al. | |
| 5,230,072 A | 7/1993 | Smith et al. | |
| 5,276,703 A | 1/1994 | Budin et al. | |
| 5,361,401 A | 11/1994 | Pirillo | |
| 5,422,889 A | 6/1995 | Sevenhans et al. | |
| 5,454,010 A | 9/1995 | Leveque | |
| 5,479,441 A | 12/1995 | Tymes et al. | |
| 5,493,671 A | 2/1996 | Pitt et al. | |
| 5,515,365 A | 5/1996 | Summer et al. | |
| 5,734,966 A | 3/1998 | Farrer et al. | |
| 5,737,609 A | 4/1998 | Reed et al. | |
| 5,805,442 A | 9/1998 | Crater et al. | |
| 5,892,962 A | 4/1999 | Cloutier | |
| 5,909,640 A | 6/1999 | Farrer et al. | |
| 5,925,100 A | 7/1999 | Drewry et al. | |
| 6,169,992 B1 | 1/2001 | Beall et al. | |
| 6,182,252 B1 | 1/2001 | Wong et al. | |
| 6,198,480 B1 | 3/2001 | Cotugno et al. | |
| 6,345,288 B1 | 2/2002 | Reed et al. | |
| 6,377,162 B1 | 4/2002 | Delestienne et al. | |
| 6,430,602 B1 | 8/2002 | Kay et al. | |
| 6,473,788 B1 | 10/2002 | Kim et al. | |
| 6,510,350 B1 | 1/2003 | Steen, III et al. | |
| 6,553,405 B1 | 4/2003 | Desrochers | |
| 6,570,867 B1 | 5/2003 | Robinson et al. | |
| 6,618,709 B1 | 9/2003 | Sneeringer | |
| 6,675,193 B1 | 1/2004 | Slavin et al. | |
| 6,757,714 B1 | 6/2004 | Hansen | |
| 6,760,886 B1 * | 7/2004 | Nadon | G06F 8/71 709/203 |
| 6,766,361 B1 | 7/2004 | Venigalla | |
| 6,797,921 B1 | 9/2004 | Niedereder et al. | |
| 6,810,522 B2 | 10/2004 | Cook et al. | |
| 6,813,587 B2 | 11/2004 | McIntyre et al. | |
| 6,850,255 B2 | 2/2005 | Muschetto | |
| 6,859,757 B2 | 2/2005 | Muehl et al. | |
| 6,874,084 B1 * | 3/2005 | Dobner | H04L 63/0281 709/223 |
| 6,915,330 B2 | 7/2005 | Hardy et al. | |
| 6,980,558 B2 | 12/2005 | Aramoto | |
| 6,993,555 B2 | 1/2006 | Kay et al. | |
| 7,031,520 B2 | 4/2006 | Tunney | |
| 7,046,134 B2 | 5/2006 | Hansen | |
| 7,047,159 B2 | 5/2006 | Muehl et al. | |
| 7,054,922 B2 | 5/2006 | Kinney et al. | |
| 7,082,383 B2 | 7/2006 | Baust et al. | |
| 7,082,460 B2 | 7/2006 | Hansen et al. | |
| 7,117,239 B1 | 10/2006 | Hansen | |
| 7,130,812 B1 | 10/2006 | Iyer et al. | |
| 7,149,792 B1 | 12/2006 | Hansen et al. | |
| 7,178,149 B2 | 2/2007 | Hansen | |
| 7,185,014 B1 | 2/2007 | Hansen | |
| 7,250,892 B2 | 7/2007 | Bornhoevd et al. | |
| 7,254,601 B2 | 8/2007 | Baller et al. | |
| 7,269,732 B2 | 9/2007 | Kilian-Kehr | |
| 7,321,686 B2 | 1/2008 | Shibata et al. | |
| 7,341,197 B2 | 3/2008 | Muehl et al. | |
| 7,350,188 B2 * | 3/2008 | Schulz | G06Q 10/06 717/104 |
| 7,380,236 B2 | 5/2008 | Hawley | |
| 7,467,203 B2 * | 12/2008 | Kang | H04L 29/12113 370/328 |
| 7,493,594 B2 * | 2/2009 | Shenfield | G06F 8/10 717/102 |
| 7,496,911 B2 | 2/2009 | Rowley et al. | |
| 7,523,395 B1 * | 4/2009 | Namait | G06F 17/246 715/212 |
| 7,529,570 B2 | 5/2009 | Shirota | |
| 7,529,750 B2 | 5/2009 | Bair | |
| 7,529,763 B2 | 5/2009 | Hulse et al. | |
| 7,536,673 B2 | 5/2009 | Brendle et al. | |
| 7,546,602 B2 * | 6/2009 | Hejlsberg | G06F 9/54 717/114 |
| 7,555,355 B2 | 6/2009 | Meyer | |
| 7,566,005 B2 | 7/2009 | Heusermann et al. | |
| 7,570,755 B2 | 8/2009 | Williams et al. | |
| 7,587,251 B2 | 9/2009 | Hopsecger | |
| 7,591,006 B2 | 9/2009 | Werner | |
| 7,593,917 B2 | 9/2009 | Werner | |
| 7,613,290 B2 | 11/2009 | Williams et al. | |
| 7,616,642 B2 | 11/2009 | Anke et al. | |
| 7,617,198 B2 | 11/2009 | Durvasula | |
| 7,617,459 B2 * | 11/2009 | Ho | G06F 17/30893 715/762 |
| 7,624,092 B2 | 11/2009 | Lieske et al. | |
| 7,624,371 B2 | 11/2009 | Kulkarni et al. | |
| 7,644,120 B2 | 1/2010 | Todorov et al. | |
| 7,644,129 B2 | 1/2010 | Videlov | |
| 7,647,407 B2 | 1/2010 | Omshehe et al. | |
| 7,653,902 B2 | 1/2010 | Bozak et al. | |
| 7,657,868 B2 * | 2/2010 | Shenfield | G06F 8/20 715/763 |
| 7,673,141 B2 | 3/2010 | Killian-Kehr et al. | |
| 7,684,621 B2 | 3/2010 | Tunney | |
| 7,703,024 B2 | 4/2010 | Kautzleban et al. | |
| 7,707,550 B2 | 4/2010 | Resnick et al. | |
| 7,725,815 B2 | 5/2010 | Peters | |
| 7,728,838 B2 | 6/2010 | Forney et al. | |
| 7,730,498 B2 | 6/2010 | Resnick et al. | |
| 7,743,015 B2 | 6/2010 | Schmitt | |
| 7,743,155 B2 | 6/2010 | Pisharody et al. | |
| 7,650,607 B2 | 7/2010 | Resnick et al. | |
| 7,752,335 B2 | 7/2010 | Boxenhorn | |

(56) References Cited

U.S. PATENT DOCUMENTS

| | | | |
|---|---|---|---|
| 7,757,234 B2 | 7/2010 | Krebs | |
| 7,761,354 B2 | 7/2010 | Kling et al. | |
| 7,774,369 B2 | 8/2010 | Herzog et al. | |
| 7,779,089 B2 | 8/2010 | Hessmer et al. | |
| 7,779,383 B2 | 8/2010 | Bornhoevd et al. | |
| 7,783,984 B2 | 8/2010 | Roediger et al. | |
| 7,802,238 B2 | 9/2010 | Clinton | |
| 7,814,044 B2 | 10/2010 | Schwerk | |
| 7,814,208 B2 | 10/2010 | Stephenson et al. | |
| 7,817,039 B2 | 10/2010 | Bornhoevd et al. | |
| 7,827,169 B2 | 11/2010 | Enenkiel | |
| 7,831,600 B2 | 11/2010 | Kilian | |
| 7,840,701 B2 | 11/2010 | Hsu et al. | |
| 7,852,861 B2 | 12/2010 | Wu et al. | |
| 7,853,241 B1 | 12/2010 | Harrison | |
| 7,853,924 B2 | 12/2010 | Curran | |
| 7,860,968 B2 | 12/2010 | Bornhoevd et al. | |
| 7,865,442 B1 | 1/2011 | Sowell | |
| 7,865,731 B2 | 1/2011 | Kilian-Kehr | |
| 7,865,939 B2 | 1/2011 | Schuster | |
| 7,873,666 B2 | 1/2011 | Sauermann | |
| 7,882,148 B2 | 2/2011 | Werner et al. | |
| 7,886,278 B2 | 2/2011 | Stulski | |
| 7,890,388 B2 | 2/2011 | Mariotti | |
| 7,890,568 B2 | 2/2011 | Belenki | |
| 7,895,115 B2 | 2/2011 | Bayyapu et al. | |
| 7,899,777 B2 | 3/2011 | Baier et al. | |
| 7,899,803 B2 | 3/2011 | Cotter et al. | |
| 7,908,278 B2 | 3/2011 | Akkiraju et al. | |
| 7,917,629 B2 | 3/2011 | Werner | |
| 7,921,137 B2 | 4/2011 | Lieske et al. | |
| 7,925,735 B2 * | 4/2011 | Erickson | G06F 9/54 705/1.1 |
| 7,925,979 B2 | 4/2011 | Forney et al. | |
| 7,937,370 B2 | 5/2011 | Hansen | |
| 7,937,408 B2 | 5/2011 | Stuhec | |
| 7,941,784 B2 * | 5/2011 | Shenfield | G06F 9/445 717/107 |
| 7,945,691 B2 | 5/2011 | Dharamshi | |
| 7,953,219 B2 | 5/2011 | Freedman et al. | |
| 7,954,107 B2 | 5/2011 | Mao et al. | |
| 7,954,115 B2 | 5/2011 | Gisolfi | |
| 7,966,418 B2 | 6/2011 | Shedrinsky | |
| 7,975,024 B2 | 7/2011 | Nudler | |
| 7,987,176 B2 | 7/2011 | Latzina et al. | |
| 7,987,193 B2 | 7/2011 | Ganapam et al. | |
| 7,992,200 B2 | 8/2011 | Kuehr-McLaren et al. | |
| 8,000,991 B2 | 8/2011 | Montagut | |
| 8,005,879 B2 | 8/2011 | Bornhoevd et al. | |
| 8,024,218 B2 | 9/2011 | Kumar et al. | |
| 8,024,743 B2 | 9/2011 | Werner | |
| 8,051,045 B2 | 11/2011 | Vogler | |
| 8,055,758 B2 | 11/2011 | Hansen | |
| 8,055,787 B2 | 11/2011 | Victor et al. | |
| 8,060,886 B2 | 11/2011 | Hansen | |
| 8,065,397 B2 | 11/2011 | Taylor et al. | |
| 8,069,362 B2 | 11/2011 | Gebhart et al. | |
| 8,073,331 B1 | 12/2011 | Mazed | |
| 8,073,857 B2 * | 12/2011 | Sreekanth | G06F 8/10 707/756 |
| 8,074,215 B2 | 12/2011 | Cohen et al. | |
| 8,081,584 B2 | 12/2011 | Thibault et al. | |
| 8,082,322 B1 | 12/2011 | Pascarella et al. | |
| 8,090,452 B2 | 1/2012 | Johnson et al. | |
| 8,090,552 B2 | 1/2012 | Henry et al. | |
| 8,095,632 B2 | 1/2012 | Hessmer et al. | |
| 8,108,543 B2 | 1/2012 | Hansen | |
| 8,126,903 B2 | 2/2012 | Lehmann et al. | |
| 8,127,237 B2 | 2/2012 | Beringer | |
| 8,131,694 B2 | 3/2012 | Bender et al. | |
| 8,131,838 B2 | 3/2012 | Bornhoevd et al. | |
| 8,132,149 B2 * | 3/2012 | Shenfield | G06F 8/20 715/763 |
| 8,136,034 B2 | 3/2012 | Stanton et al. | |
| 8,145,468 B2 | 3/2012 | Fritzdche et al. | |
| 8,145,681 B2 | 3/2012 | Macaleer et al. | |
| 8,151,257 B2 | 4/2012 | Zachmann | |
| 8,156,117 B2 | 4/2012 | Krylov et al. | |
| 8,156,208 B2 | 4/2012 | Bornhoevd et al. | |
| 8,156,473 B2 | 4/2012 | Heidasch | |
| 8,161,160 B2 * | 4/2012 | London | H04L 67/025 709/226 |
| 8,183,995 B2 | 5/2012 | Wang et al. | |
| 8,190,708 B1 | 5/2012 | Short et al. | |
| 8,229,944 B2 | 7/2012 | Latzina et al. | |
| 8,230,333 B2 | 7/2012 | Decherd et al. | |
| 8,249,906 B2 | 8/2012 | Ponce de Leon | |
| 8,250,169 B2 | 8/2012 | Beringer et al. | |
| 8,254,249 B2 | 8/2012 | Wen et al. | |
| 8,261,193 B1 | 9/2012 | Alur et al. | |
| 8,271,935 B2 | 9/2012 | Lewis | |
| 8,280,009 B2 | 10/2012 | Stepanian | |
| 8,284,033 B2 | 10/2012 | Moran | |
| 8,285,807 B2 | 10/2012 | Slavin et al. | |
| 8,291,039 B2 | 10/2012 | Shedrinsky | |
| 8,291,475 B2 | 10/2012 | Jackson et al. | |
| 8,296,198 B2 | 10/2012 | Bhatt et al. | |
| 8,296,266 B2 | 10/2012 | Lehmann et al. | |
| 8,296,413 B2 | 10/2012 | Bornhoevd et al. | |
| 8,301,770 B2 | 10/2012 | Van Coppenolle et al. | |
| 8,306,635 B2 | 11/2012 | Pryor | |
| 8,312,383 B2 | 11/2012 | Gilfix | |
| 8,321,790 B2 | 11/2012 | Sherrill et al. | |
| 8,321,792 B1 | 11/2012 | Alur et al. | |
| 8,331,855 B2 | 12/2012 | William et al. | |
| 8,346,520 B2 | 1/2013 | Lu et al. | |
| 8,359,116 B2 | 1/2013 | Manthey | |
| 8,364,300 B2 | 1/2013 | Pouyez et al. | |
| 8,370,479 B2 | 2/2013 | Hart et al. | |
| 8,370,826 B2 | 2/2013 | Johnson et al. | |
| 8,375,292 B2 | 2/2013 | Coffman et al. | |
| 8,375,362 B1 | 2/2013 | Brette et al. | |
| RE44,110 E | 3/2013 | Venigalla | |
| 8,392,116 B2 | 3/2013 | Lehmann et al. | |
| 8,392,561 B1 | 3/2013 | Dyer et al. | |
| 8,396,929 B2 | 3/2013 | Helfman et al. | |
| 8,397,056 B1 | 3/2013 | Malks et al. | |
| 8,406,119 B2 | 3/2013 | Taylor et al. | |
| 8,407,666 B2 * | 3/2013 | Shenfield | G06F 9/445 717/107 |
| 8,412,579 B2 | 4/2013 | Gonzalez | |
| 8,417,764 B2 | 4/2013 | Fletcher et al. | |
| 8,417,854 B2 | 4/2013 | Weng et al. | |
| 8,423,418 B2 | 4/2013 | Hald et al. | |
| 8,424,058 B2 | 4/2013 | Vinogradov et al. | |
| 8,433,664 B2 | 4/2013 | Ziegler et al. | |
| 8,433,815 B2 | 4/2013 | Van Coppenolle et al. | |
| 8,438,132 B1 | 5/2013 | Dziuk et al. | |
| 8,442,933 B2 | 5/2013 | Baier et al. | |
| 8,442,999 B2 | 5/2013 | Gorelik et al. | |
| 8,443,069 B2 | 5/2013 | Bagepalli et al. | |
| 8,443,071 B2 | 5/2013 | Lu et al. | |
| 8,457,996 B2 | 6/2013 | Winkler et al. | |
| 8,458,189 B1 | 6/2013 | Ludwig et al. | |
| 8,458,246 B2 * | 6/2013 | Guney | H04L 67/303 707/695 |
| 8,458,315 B2 | 6/2013 | Miche et al. | |
| 8,458,596 B2 | 6/2013 | Malks et al. | |
| 8,458,600 B2 | 6/2013 | Dheap et al. | |
| 8,473,317 B2 | 6/2013 | Santoso et al. | |
| 8,478,861 B2 | 7/2013 | Taylor et al. | |
| 8,484,156 B2 | 7/2013 | Hancsarik et al. | |
| 8,489,527 B2 | 7/2013 | Van Coppenolle et al. | |
| 8,490,047 B2 | 7/2013 | Petschnigg et al. | |
| 8,490,876 B2 | 7/2013 | Tan et al. | |
| 8,495,072 B1 | 7/2013 | Kapoor et al. | |
| 8,495,511 B2 | 7/2013 | Redpath | |
| 8,495,683 B2 | 7/2013 | Van Coppenolle et al. | |
| 8,516,296 B2 | 8/2013 | Mendu | |
| 8,516,383 B2 | 8/2013 | Bryant et al. | |
| 8,521,621 B1 | 8/2013 | Hetzer et al. | |
| 8,522,217 B2 | 8/2013 | Dutta et al. | |
| 8,522,341 B2 | 8/2013 | Nochta et al. | |
| 8,532,008 B2 | 9/2013 | Das et al. | |

(56) References Cited

U.S. PATENT DOCUMENTS

| | | | |
|---|---|---|---|
| 8,533,660 B2 | 9/2013 | Mehr et al. | |
| 8,538,799 B2 | 9/2013 | Haller et al. | |
| 8,543,568 B2 | 9/2013 | Wagenblatt | |
| 8,547,838 B2 | 10/2013 | Lee et al. | |
| 8,549,157 B2 | 10/2013 | Schnellbaecher | |
| 8,555,248 B2 | 10/2013 | Brunswig et al. | |
| 8,560,636 B2 | 10/2013 | Kieselbach | |
| 8,560,713 B2 | 10/2013 | Moreira Sa de Souza et al. | |
| 8,566,193 B2 | 10/2013 | Singh et al. | |
| 8,571,908 B2 | 10/2013 | Li et al. | |
| 8,572,107 B2 | 10/2013 | Fan et al. | |
| 8,577,904 B2 | 11/2013 | Marston | |
| 8,578,059 B2 | 11/2013 | Odayappan et al. | |
| 8,578,328 B2 | 11/2013 | Kamiyama et al. | |
| 8,578,330 B2 | 11/2013 | Dreiling et al. | |
| 8,584,082 B2 | 11/2013 | Baird et al. | |
| 8,588,765 B1 | 11/2013 | Harrison | |
| 8,594,023 B2 | 11/2013 | He et al. | |
| 8,635,254 B2 | 1/2014 | Harvey et al. | |
| 8,645,489 B1* | 2/2014 | Riggins | G06F 17/30017 709/217 |
| 8,689,181 B2 | 4/2014 | Biron, III | |
| 8,719,421 B2* | 5/2014 | Mao | G06F 16/958 709/227 |
| 8,752,074 B2 | 6/2014 | Hansen | |
| 8,762,497 B2 | 6/2014 | Hansen | |
| 8,769,095 B2 | 7/2014 | Hart et al. | |
| 8,788,632 B2 | 7/2014 | Taylor et al. | |
| 8,898,294 B2 | 11/2014 | Hansen | |
| 8,924,470 B2* | 12/2014 | Krahulec | G06F 17/30893 707/999.01 |
| 9,002,980 B2 | 4/2015 | Shedrinsky | |
| 9,003,478 B2 | 4/2015 | Kavantzas et al. | |
| 9,088,462 B2* | 7/2015 | Burckart | H04L 67/2852 |
| 9,418,173 B2* | 8/2016 | Prasad | G06F 17/30905 |
| 9,467,533 B2 | 10/2016 | Huber et al. | |
| 2002/0004824 A1* | 1/2002 | Cuan | G06F 17/3089 709/208 |
| 2002/0070968 A1 | 6/2002 | Austin et al. | |
| 2002/0099454 A1 | 7/2002 | Gerrity | |
| 2002/0099692 A1 | 7/2002 | Shah et al. | |
| 2002/0138596 A1 | 9/2002 | Darwin et al. | |
| 2003/0093710 A1 | 5/2003 | Hashimoto et al. | |
| 2003/0117280 A1 | 6/2003 | Prehn | |
| 2004/0027376 A1 | 2/2004 | Calder et al. | |
| 2004/0046789 A1* | 3/2004 | Inanoria | G06F 8/38 715/748 |
| 2004/0133635 A1 | 7/2004 | Spriestersbach et al. | |
| 2004/0158455 A1 | 8/2004 | Spivack et al. | |
| 2004/0158629 A1 | 8/2004 | Herbeck et al. | |
| 2004/0168115 A1 | 8/2004 | Bauernschmidt | |
| 2004/0177124 A1 | 9/2004 | Hansen | |
| 2005/0015369 A1 | 1/2005 | Styles et al. | |
| 2005/0021506 A1 | 1/2005 | Sauermann et al. | |
| 2005/0027675 A1 | 2/2005 | Schmitt et al. | |
| 2005/0060186 A1 | 3/2005 | Blowers et al. | |
| 2005/0081157 A1 | 4/2005 | Clark et al. | |
| 2005/0102362 A1 | 5/2005 | Price et al. | |
| 2005/0108418 A1 | 5/2005 | Bedi et al. | |
| 2005/0198137 A1 | 9/2005 | Pavlik et al. | |
| 2005/0213563 A1 | 9/2005 | Shaffer et al. | |
| 2005/0240427 A1 | 10/2005 | Crichlow | |
| 2005/0278692 A1 | 12/2005 | Sridhar | |
| 2005/0289154 A1 | 12/2005 | Weiss et al. | |
| 2006/0186986 A1 | 8/2006 | Ma et al. | |
| 2006/0208871 A1 | 9/2006 | Hansen | |
| 2006/0271643 A1 | 11/2006 | Stallman | |
| 2007/0005736 A1 | 1/2007 | Hansen et al. | |
| 2007/0016557 A1 | 1/2007 | Moore et al. | |
| 2007/0027854 A1 | 2/2007 | Rao et al. | |
| 2007/0027914 A1 | 2/2007 | Agiwal | |
| 2007/0104180 A1 | 5/2007 | Aizu et al. | |
| 2007/0118844 A1 | 5/2007 | Huang | |
| 2007/0130541 A1 | 6/2007 | Louch | |
| 2007/0162486 A1 | 7/2007 | Brueggemann et al. | |
| 2007/0174158 A1 | 7/2007 | Bredehoeft et al. | |
| 2007/0260593 A1 | 11/2007 | Delvat | |
| 2007/0266384 A1 | 11/2007 | Labrou et al. | |
| 2007/0300172 A1 | 12/2007 | Runge et al. | |
| 2008/0065982 A1* | 3/2008 | Evanchik | G06F 3/0483 715/255 |
| 2008/0098085 A1 | 4/2008 | Krane et al. | |
| 2008/0140705 A1 | 6/2008 | Luo | |
| 2008/0147835 A1 | 6/2008 | Chandra | |
| 2008/0172632 A1* | 7/2008 | Stambaugh | G06F 3/04817 715/781 |
| 2008/0208890 A1 | 8/2008 | Milam | |
| 2008/0216050 A1 | 9/2008 | Behrendt | |
| 2008/0222599 A1 | 9/2008 | Nathan et al. | |
| 2008/0231414 A1 | 9/2008 | Canosa | |
| 2008/0244077 A1 | 10/2008 | Canosa | |
| 2008/0244594 A1 | 10/2008 | Chen et al. | |
| 2008/0255782 A1 | 10/2008 | Bilac et al. | |
| 2008/0271047 A1* | 10/2008 | Rafnsson | G06F 17/243 719/311 |
| 2008/0288547 A1 | 11/2008 | Brodosky | |
| 2008/0288956 A1 | 11/2008 | Videlov | |
| 2008/0295117 A1 | 11/2008 | Videlov | |
| 2008/0319947 A1 | 12/2008 | Latzina et al. | |
| 2009/0006391 A1 | 1/2009 | Ram | |
| 2009/0150431 A1 | 6/2009 | Schmidt et al. | |
| 2009/0193148 A1 | 7/2009 | Jung et al. | |
| 2009/0235187 A1* | 9/2009 | Kim | G06F 17/30905 715/760 |
| 2009/0259442 A1 | 10/2009 | Gandikota et al. | |
| 2009/0265705 A1 | 10/2009 | Wei | |
| 2009/0265760 A1 | 10/2009 | Zhu et al. | |
| 2009/0271778 A1 | 10/2009 | Mandyam et al. | |
| 2009/0299990 A1 | 12/2009 | Setlur et al. | |
| 2009/0300060 A1 | 12/2009 | Beringer et al. | |
| 2009/0300528 A1 | 12/2009 | Stambaugh | |
| 2009/0319518 A1 | 12/2009 | Koudas et al. | |
| 2009/0327337 A1 | 12/2009 | Lee et al. | |
| 2010/0017379 A1 | 1/2010 | Naibo et al. | |
| 2010/0017419 A1 | 1/2010 | Francis et al. | |
| 2010/0037168 A1 | 2/2010 | Thayne | |
| 2010/0064277 A1 | 3/2010 | Baird et al. | |
| 2010/0077001 A1 | 3/2010 | Vogel et al. | |
| 2010/0077456 A1 | 3/2010 | Drive et al. | |
| 2010/0094843 A1 | 4/2010 | Cras | |
| 2010/0125584 A1 | 5/2010 | Navas | |
| 2010/0125826 A1 | 5/2010 | Rice et al. | |
| 2010/0131530 A1* | 5/2010 | Gibson | G06F 17/3087 707/758 |
| 2010/0138865 A1 | 6/2010 | Rai et al. | |
| 2010/0250440 A1 | 9/2010 | Wang et al. | |
| 2010/0257242 A1 | 10/2010 | Morris | |
| 2010/0286937 A1 | 11/2010 | Hedley et al. | |
| 2010/0287075 A1 | 11/2010 | Herzog et al. | |
| 2010/0293360 A1 | 11/2010 | Schoop et al. | |
| 2010/0318370 A1 | 12/2010 | Bhattacharyya | |
| 2011/0078599 A1 | 3/2011 | Guertler et al. | |
| 2011/0078600 A1 | 3/2011 | Guertler et al. | |
| 2011/0099190 A1 | 4/2011 | Kreibe | |
| 2011/0106615 A1 | 5/2011 | Churchill et al. | |
| 2011/0137883 A1 | 6/2011 | Lagad et al. | |
| 2011/0138354 A1 | 6/2011 | Hertenstein et al. | |
| 2011/0145712 A1 | 6/2011 | Pontier et al. | |
| 2011/0145933 A1 | 6/2011 | Gambhir et al. | |
| 2011/0153505 A1 | 6/2011 | Brunswig et al. | |
| 2011/0154226 A1 | 6/2011 | Guertler et al. | |
| 2011/0161409 A1 | 6/2011 | Nair et al. | |
| 2011/0161941 A1* | 6/2011 | Thomson | G06F 8/34 717/140 |
| 2011/0173203 A1 | 7/2011 | Jung et al. | |
| 2011/0173220 A1 | 7/2011 | Jung et al. | |
| 2011/0173264 A1 | 7/2011 | Kelly | |
| 2011/0208788 A1 | 8/2011 | Heller et al. | |
| 2011/0209069 A1 | 8/2011 | Mohler | |
| 2011/0219327 A1 | 9/2011 | Middleton, Jr. et al. | |
| 2011/0231592 A1 | 9/2011 | Bleier et al. | |
| 2011/0270959 A1 | 11/2011 | Schlusser et al. | |
| 2011/0276360 A1 | 11/2011 | Barth et al. | |

(56) References Cited

U.S. PATENT DOCUMENTS

| | | |
|---|---|---|
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096073 A1 | 4/2012 | Elwood et al. |
| 2012/0096429 A1* | 4/2012 | Desai ............... G06F 8/34 717/107 |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158825 A1 | 6/2012 | Ganser |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173671 A1 | 7/2012 | Callaghan et al. |
| 2012/0179905 A1 | 7/2012 | Ackerly |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254111 A1 | 10/2012 | Carmichael |
| 2012/0254825 A1 | 10/2012 | Sharma et al. |
| 2012/0259932 A1 | 10/2012 | Kang et al. |
| 2012/0278187 A1 | 11/2012 | Lunt |
| 2012/0284259 A1 | 11/2012 | Jehuda |
| 2012/0284686 A1 | 11/2012 | Sharrma |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0166563 A1 | 6/2013 | Mueller et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185246 A1 | 7/2013 | Salloum et al. |
| 2013/0185593 A1 | 7/2013 | Taylor et al. |
| 2013/0185786 A1 | 7/2013 | Dyer et al. |
| 2013/0191726 A1* | 7/2013 | Park ............... G06F 16/958 715/235 |
| 2013/0191767 A1 | 7/2013 | Peters et al. |
| 2013/0205277 A1 | 8/2013 | Seven et al. |
| 2013/0207980 A1 | 8/2013 | Ankisettipalli et al. |
| 2013/0211555 A1 | 8/2013 | Lawson et al. |
| 2013/0246897 A1 | 9/2013 | O'Donnell |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0304581 A1 | 11/2013 | Soroca et al. |
| 2014/0006923 A1* | 1/2014 | Barak ............... G06F 17/30905 715/234 |
| 2014/0019432 A1 | 1/2014 | Lunenfeld |
| 2014/0040863 A1 | 2/2014 | Hale |
| 2014/0149561 A1 | 5/2014 | Bae et al. |
| 2014/0157224 A1 | 6/2014 | Capuozzo |
| 2014/0201244 A1 | 7/2014 | Zhou et al. |
| 2014/0282370 A1 | 9/2014 | Schaefer et al. |
| 2015/0268936 A1 | 9/2015 | Huber et al. |
| 2015/0269130 A1 | 9/2015 | Huber et al. |
| 2015/0271272 A1 | 9/2015 | Mahoney et al. |
| 2015/0334182 A1 | 11/2015 | Wu et al. |
| 2015/0378579 A1* | 12/2015 | Kaplinger ............... H04L 67/02 715/745 |
| 2015/0378685 A1* | 12/2015 | Kaplinger ............... H04L 67/02 717/104 |
| 2018/0077143 A1* | 3/2018 | Sridharan ............... G06Q 10/10 |

FOREIGN PATENT DOCUMENTS

| | | |
|---|---|---|
| WO | 9921152 A1 | 4/1999 |
| WO | 0077592 A2 | 12/2000 |
| WO | 2008115995 A1 | 9/2008 |
| WO | 2014145084 A1 | 9/2014 |

OTHER PUBLICATIONS

International Search Report and Written Opinion issued in International Application No. PCT/US2015/021894, dated Aug. 5, 2015.
Hart Server, retrieved from internet archive of hartcomm.org http://www.hartcomm.org/server2/index.html, 13 pages, 2001.
RAY, Learning XML, first edition, 277 pages, 2001—part 1—p. 1-146 RAY, Learning XML, first edition, 277 pages, 2001—part 2—p. 147-277.
Shi, L. et al., Understanding Text Corpora with Multiple Facets, IEEE Symposium on Visual Analytics Science and Technology (VAST), 2010, 99-106.
PJ Murray, Corba and Web Services, 2002, pp. 1-20.
Phillippe Mougin, Web Services, Business Objects and Component Models, 2001, pp. 3-39.
William Sellick, RGU Honours Project (Soft Real-time Data Viewer using WITSML), 2008, pp. 4-18.
SAP, SAP Business Objects Data Services, 2009, pp. 24-92.
Office Action issued in related U.S. Appl. No. 14/222,138 dated Dec. 18, 2015.
Office Action issued in related U.S. Appl. No. 14/222,138 dated Dec. 29, 2016.
Office Action issued in related U.S. Appl. No. 14/222,138 dated Jul. 20, 2016.
Office Action issued in related U.S. Appl. No. 14/222,138 dated Jul. 21, 2017.
Office Action issued in related U.S. Appl. No. 14/222,166 dated Feb. 12, 2015.
Office Action issued in related U.S. Appl. No. 14/222,166 dated Nov. 24, 2015.
Office Action issued in related U.S. Appl. No. 14/222,166 dated Oct. 6, 2016.
Office Action issued in related U.S. Appl. No. 14/222,166 dated May 31, 2017.

* cited by examiner

SYSTEMS AND METHODS FOR DEVELOPING AND USING REAL-TIME DATA APPLICATIONS

FIELD OF THE INVENTION

The present invention generally relates to systems and methods for providing real-time data applications. More particularly, in certain embodiments, the invention relates to the testing of real-time data applications deployed on computing devices in a heterogeneous environment. In other embodiments, the invention relates to the development of real-time data applications. In yet other embodiments, the invention relates to computing applications including multi-level hierarchical real-time data.

CROSS REFERENCE TO RELATED APPLICATION

The present application is a national stage application of International PCT Application No. PCT/US2015/21894, filed Mar. 20, 2015, which claims priority to, and the benefit of, U.S. application Ser. No. 14/222,166, titled "System and Method for Testing Computing Devices in a Heterogeneous Environment," filed Mar. 21, 2014; U.S. application Ser. No. 14/222,276, titled "System and Method for Developing Real-Time Web-Service Objects," filed Mar. 21, 2014; and U.S. application Ser. No. 14/222,138, titled "System and Method of Using Multi-Level Hierarchical Data in Displaying Real-Time Web-Service Objects," filed Mar. 21, 2014. The contents of each of these applications are incorporated by reference herein in their entireties.

BACKGROUND

The Internet of Things ("IOT") refers to the network of systems, devices, and/or physical objects (collectively referred to as "systems") existing in the real world, ranging from automobiles to heart monitors. These physical objects and/or devices are equipped and/or embedded with software, sensors, electronics, communication means and the like, that enable them to, among other things, communicate and exchange data. The number of systems that make up the Internet of Things is rapidly growing. Some industry analysts have estimated that the number of connected systems (in an industrial, consumer, government, medical, and business setting) may rise from five billion to one trillion over the next ten years.

In light of the rapid expansion of the Internet of Things, mashups are being developed and used to more efficiently and effectively manage, receive, and output the large amount of data associated with billions of systems. Mashups are applications (e.g., Web applications) and/or Web pages that collect, retrieve and/or use content (e.g., resources, data, services) from multiple and different sources (e.g., Web pages, Web services) to create and/or provide new services, resources, information, and the like. For example, a mashup application may (1) collect location information and data stream (e.g., usage information) associated with a set of interconnected systems, and (2) use a map web service provided by another system (e.g., Google Maps), to generate and/or display the each of the set of interconnected systems plotted on a map, along with corresponding information, such as data streams shown as gauges (e.g., usage information).

The development of mashup applications and/or Web pages is often time consuming and costly due to the complexities of, among other things, accessing and aggregating data from the connected devices. These complexities are caused, for example, by the use of real-time data by mashup applications and/or Web pages (e.g., real-time data applications). Real-time data is information that is collected and/or made available by mashup applications and/or Web pages immediately (or shortly after) it is made available by its source. Real-time data is most useful at or around the time that it is made available by its source, and its usefulness reduces as time passes (e.g., as the data becomes "older"). For example, real-time (e.g., current) temperature and weather data is most useful at the time that it is retrieved and/or made available, rather than at a later time when that temperature and weather data becomes less useful and/or obsolete.

Other complexities in the development of mashup applications and/or Web pages are caused by real-time data residing on (e.g., being stored on or generated by) different types of platforms (e.g., systems, devices). These platforms are typically managed by a variety of sources and/or third party entities. These various sources and/or third party entities make real-time data accessible, from their particular platforms, through their specific Web services and application programming interfaces (API). Examples of real-time Web services (and their data) include social feeds (e.g., Twitter), Web chat services, live charts, on-screen dashboards, activity streams, and real-time Web analytics. Real-time Web services may include functions performed by enterprise software and systems, such as customer relationship management and enterprise resource planning (CRM/ERP) systems, data warehouses and Hadoop services. Real-time data may include data stored in relational databases, and time series data (e.g., sequence of data points) acquired from sensors and electronic devices embedded in machinery. For example, such machinery may correspond to and/or be in an industrial facility, a medical facility, an energy generation and distribution facility, a freight and passenger transportation facility, and the like.

Due to the variety of systems, interfaces, protocols and the like that are used in mashup applications and/or Web pages, their development often requires developers to understand and employ multiple programming languages, technologies and protocols. For example, to create a simple real-time Web application with mashups, a developer may need programming proficiency in extensive markup language (XML), JavaScript, Hypertext Markup Language (HTML) and Cascading Style Sheets (CSS), as well as Web APIs and protocols of various sources web service that are providing the services, resources and/or data. Moreover, such real-time Web applications with mashups may require developers to have proficiency in networking and the hardware specifications of the variety of computing devices that are to consume (e.g., collect, read, retrieve, download, use) the data and/or services provided by the Web application.

Additionally, mashup applications and/or Web pages use and are deployed to a heterogeneous environment. A heterogeneous environment refers to a computing environment in which hardware and software varies among the systems in the environment. As a result, a mashup application that is to be used by two different systems in a heterogeneous environment must be tested specifically for the technical specifications of each of the two systems. Such testing may include, for example, ensuring that the processing capabilities of each system are sufficient to use the application, and that the application is compatible with the operating system of each of the systems.

In fact, because the Internet of Things is still developing, companies, organizations and the like may not yet realize the benefits provided by mashup applications and/or Web pages, real-time data, and the services and products thereby enabled. In that regard, consumers, business users, and industrial users in such companies and organizations are well suited to develop such mashup applications and/or Web pages, and services and products employing real-time data, because they understand their companies and organizations, as well as their particular needs (e.g., business needs). Yet, the complexities described above, among others, create technical barriers in developing, accessing, testing and managing mashups such as real-time Web applications.

There is a need, therefore, for systems and methods for making the development of mashup applications and/or Web pages including real-time Web services and real-time data in a more cost and time efficient manner. There additionally exists a need for systems and methods that allow for testing mashup applications and/or Web pages, including testing code of classes of Web objects that employ real-time data and services.

SUMMARY

In general overview, the embodiments described herein provide development platforms (e.g., development workspaces) for building client-side computing-device applications (e.g., real-time Web applications, mobile applications) that include mashup elements associated with connected devices. The development platform enables and simplifies the development of Internet of Things (IoT) applications. By employing graphical elements as a programming and/or coding basis to develop real-time Web applications, the development platform reduces and/or obviates the need for traditional textual-based programming and/or coding. Rather, graphical elements corresponding to real-time data and services (e.g., Web data, Web services) of different types and structures are employed in the development platform. By virtue of this, low-level access functions can be more efficiently added to a development project with, for example, using simple "drag-and-drop" operations.

The development platform has been observed, in some instances, to reduce the time to develop, design and deploy real-time Web applications by over 90 percent (compared to existing text-based development tools and the like). The development platform beneficially employs testing and development tools to significantly simplify the process of application development (e.g., IoT application development), such that knowledge of programming languages and embedded controls systems, though helpful, is less useful and/or not necessary to create and deploy real-time Web applications. Moreover, developers with programming knowledge, using the development platform, can more efficiently develop more powerful real-time Web applications (e.g., having rich features). The development platform is useful in a variety of markets, business sectors, industry sectors, and the like.

For example, the development platform simplifies caching a client-side application by automatically inserting programmable code into program files of the client side application, based on actions of the developer, via elements of a mashup application and/or Web page. That is, the project files generated by the development platform are further embedded with code that enables and simplifies caching operations at the client-side application. Caching operations greatly enhance usage performance of and user experience with the client-side application by allowing the client-side application to operate with or without continuous network connectivity (e.g., with intermittent network connectivity). This reduces the need for developers to manually code or program applications, and decreases the time needed to develop applications. Moreover, individuals without programming or application development experience are thereby able to develop client-side applications having caching functionality.

In some implementations, the development platform is maintained by an intermediary party and deployed within a cloud-based system, thereby freeing the developer from the maintenance and servicing of the tools (e.g., software development kits (SDK), development libraries, and toolkits). In some implementations, the development platform includes a mashup template library for building the client-side application. The mashup template library includes, in some implementations, a list of mashup templates that developers can instantiate within their respective projects.

Another feature of the development platform is the simultaneous delivery of real-time data and code to the client-side application. Such simultaneous delivery facilitates the updating and delivery of program files of the client side-application to target computing devices. Moreover, such simultaneous delivery allows developers to see functional and/or visual effects caused by the change and/or update to the client-side application, at the same time that real-time data is delivered.

The development platform also generates a list (e.g., a manifest file) of contents, such as the client-side application and real-time data, in response to the linking of graphical coding elements within the development workspace. The generation of the manifest file reduces and/or eliminates the need for developers to make explicit definitions and links in the development project.

In some implementations, the development platform maintains data content to be used by the mashup elements. The data content may include test data, as well as third-party Web data and services accessible to the development platform. In some implementations, the development platform reproduces and/or stores some of the data within its own data storage. In some implementations, the development platform interfaces with a data warehouse that stores data curated by and intermediary party. That data is made available within the intermediary party's local network. To this end, the developer may access, via a Web-based development workspace, building elements (e.g., mashup templates) as well as content data (e.g., real-time data and services) to populate instances of the building elements.

Another feature of the development platform is the compiling, building, and combining of files of the client-side application with a single input, such as an input for saving the project files. By virtue of this, client-side applications deployed to a heterogeneous computing environment can more easily and efficiently be tested. The real-time application and real-time data are pushed and/or pulled from the development workspace to platforms and devices, for example, in response to push and/or pull commands/messages, respectively. Such consolidated actions reduce the time needed to test each application iteration caused by a design change. In this manner, the developer can update client-side applications without having to physically touch any test devices. That is, the development platform reduces and/or eliminates the need for developers to manually perform such operations, and further allows testing of devices without accessing underlying embedded control systems and operations. In addition, the development platform can push updates to multiple test devices in a heterogeneous environment.

Another feature of the development platform is the retention and/or storage, by a client-side application, of previous views and/or states of the application, its mashup elements and/or multi-level hierarchical data. For example, the development platform can retain a view of an application at a state prior to an update of the application. This allows developers to evaluate updates to a client-application with reference and/or in light of the last view.

In some implementations, the development platform delivers multi-level hierarchical real-time data including metadata information associated with data content. The client-side application uses the metadata information to ascertain a current view and/or viewable state of mashup elements. The data includes the viewable state, which has a hierarchical relationship corresponding to the structure of the data and delineated by the metadata (e.g., in a self-describing message format).

To reduce the development time to create application, the present development platform may be configured with functions to centrally manage the mechanisms when the updates are executed at the client-side application. In some implementations, the development platform may generate a list of all contents for a given distribution of the update. In some implementations, the list is recorded in an update manifest file. The development form may generate the list using an associations made between various presentation and content objects during the development of the client-side application. The association is preferably made without an application developer having to make such explicit definitions. In essence, the development platform allows individual actions by an application developer to produce multiple effects to the end application.

Applications for the systems and methods described herein are not limited to the aforementioned examples, but may be deployed in any number of contexts, as would be understood by one of ordinary skill in the art. Contents of the background are not to be considered as an admission of the contents as prior art.

In an aspect, the present disclosure provides a computer-implemented method for operating a real-time Web application (e.g., a mashup application), the computer-implemented method comprising: providing, at a client-side application executing on a computing device, a graphical user interface, wherein the graphical user interface comprises i) one or more rendering widgets for presentation of data associated with a plurality of monitored assets (e.g., wherein the monitored assets are monitored on a periodic or event-based basis) and ii) an input widget for selection of data for the presentation, wherein the input widget comprises a plurality of selectable elements (e.g., presented as a tree diagram), including i) a first set of selectable elements associated with individual monitored assets and ii) a second set of selectable elements associated with groups of one or more monitored assets; receiving, by the client-side application, a dataset associated with the plurality of monitored assets, wherein the dataset i) comprises data associated with individual monitored assets corresponding to the first set of selectable elements of the input widget and ii) is organized in a hierarchical structure; and in response to a selection of a selectable element of the input widget (e.g., a selection by a user via a user interface device), presenting, via the one or more rendering widgets of the graphical user interface, data corresponding to the selection from the dataset.

In some implementations, the monitored assets are monitored on a periodic or event-based basis. In some implementations, the dataset is received, by the client-side application, in response to a single request call by the client-side application.

In some implementations, the dataset is received, by the client-side application, as a single record set. In some implementations, the dataset is received, by the client-side application, as a single record set via two or more data streams.

In some implementations, the method also includes receiving, by the client-side application, an alert of an updated data set, wherein the alert causes, at the client-side application, a transmission of a request call for the updated dataset.

In some implementations, the method also includes, in response to a selection of a selectable element of the first set of selectable elements, presenting data associated with a respective individual monitored asset via the one or more rendering widgets of the graphical user interface.

In some implementations, the method also includes, in response to a selection of a selectable element of the second set of selectable elements, presenting data associated with a respective group of monitored assets via the one or more rendering widgets of the graphical user interface.

In some implementations, the one or more rendering widgets of the graphical user interface comprise a map widget, and wherein each received dataset associated with the plurality of monitored assets comprises data associated with a respective location for each individual monitored assets.

In some implementations, the dataset is received, by the client-side application, in one or more portions, and wherein each portion of the one or more portions is cached such that the dataset is made available for presentation upon all portions of the dataset having been received by the client-side application.

In some implementations, each level of the hierarchical structure corresponds to a respective set of selectable elements of the input widget.

In some implementations, the method also includes generating, by the client-side application, data (e.g., aggregated data) associated with each respective group of monitored assets based on data associated with individual monitored assets collectively forming the respective group.

In some implementations, the received dataset comprises data associated with one or more groups of monitored assets.

In some implementations, each second set of selectable elements of the input widget is associated with a respective location for a given group of monitored assets.

In some implementations, the input widget comprises a third set of selectable elements, wherein each third set of selectable elements is associated with a member selected from the group consisting of a geographic area, a geographic site, a geographic region, a company subdivision, and a company.

In another aspect, the present disclosure provides a computer-implemented method for operating a real-time Web application (e.g., a mashup application), the computer-implemented method comprising: providing, at a client-side application executing on a computing device, a graphical user interface including one or more rendering widgets and an input widget (e.g., presented in a tree structure) having one or more levels, wherein the one or more rendering widgets present data associated with a plurality of monitored assets; transmitting, by the client-side application, to a data content source, a request for a dataset, wherein the dataset is associated with a plurality of monitored assets (e.g., wherein the monitored assets are monitored on a periodic or event-based basis); receiving, by the client-side application, the dataset, wherein the dataset is organized in a multi-level hierarchy corresponding to the one or more levels of the input widget; and responsive to a selection of a level of the one or more levels (e.g., a selection by a user via a user interface device), displaying, by the client-side application, via the one or more rendering widgets, data corresponding to the selected level of the input widget from the dataset.

In some implementations, one or more of the plurality of monitored assets are monitored on a periodic or event-based basis.

In some implementations, the rendering widgets are associatively linked to one or more data content sources at a development workspace used to define the rendering widgets.

In some implementations, the method also includes receiving, by the client-side application, an alert of an updated data set; and responsive to the alert, cause, at the client-side application, a transmission of a request for the updated dataset.

In some implementations, the method also includes receiving a second selection at the input widget corresponding to a second level of the input widget, wherein the second selection causes the client-side application to render data from a portion of the multi-level hierarchy corresponding to the second level.

In some implementations, the graphical user interface includes a map widget, and wherein the received data set includes data for presentation on map widget.

In some implementations, the dataset is received, by the client-side application, as a single record set.

In another aspect, the present disclosure provides a system comprising: a processor and a memory having instructions stored thereon, wherein the instructions, when execute by the processor, cause the processor to: provide a graphical user interface comprising i) one or more rendering widgets for presentation of data associated with a plurality of monitored assets (e.g., wherein the monitored assets are monitored on a periodic or event-based basis) and ii) an input widget for selection of data for the presentation on the one or more rendering widgets, wherein the input widget comprises a plurality of selectable elements (e.g., presented as a tree diagram), including i) a first set of selectable elements associated with individual monitored assets and ii) a second set of selectable elements associated with groups of monitored assets; receive, via a port, a dataset associated with the plurality of monitored assets, wherein the dataset i) comprises data associated with individual monitored assets corresponding to the first set of selectable elements of the input widget and ii) is organized in a hierarchical structure; and in response to a selection of a selectable element of the input widget (e.g., a selection by a user via a user interface device), present, via the one or more rendering widgets of the graphical user interface, data corresponding to the selection from the dataset.

In some implementations, the monitored assets are monitored on a periodic or event-based basis.

In some implementations, the dataset is received, by the client-side application, in response to a single request call. In some implementations, the dataset is received as a single record set. In some implementations, the dataset is received as a single record set via two or more data streams.

In some implementations, the instructions, when executed by the processor, cause the processor to receive an alert of an updated data set; and in response to the received alert, cause a transmission of a request call for the updated dataset.

In some implementations, the instructions, when executed by the processor, cause the processor to, in response to a selection of a selectable element of the first set of selectable elements, present data associated with a respective individual monitored asset via the one or more rendering widgets of the graphical user interface.

In some implementations, the instructions, when executed by the processor, cause the processor to, in response to a selection of a selectable element of the second set of selectable elements, present data associated with a respective group of monitored assets via the one or more rendering widgets of the graphical user interface.

In some implementations, the one or more rendering widgets of the graphical user interface comprise a map widget, and wherein each received dataset associated with the plurality of monitored assets comprises data associated with a respective location for each individual monitored assets.

In some implementations, the dataset is received in one or more portions, wherein each portion of the one or more portions is cached such that the dataset is made available for presentation upon all portions of the dataset having been received by the client-side application.

In some implementations, each level of the hierarchical structure corresponds to a respective set of selectable elements of the input widget.

In some implementations, the instructions, when executed by the processor, cause the processor to generate data (e.g., aggregated data) associated with each respective group of monitored assets based on data associated with individual monitored assets collectively forming the respective group.

In some implementations, the received dataset comprises data associated with one or more groups of monitored assets.

In some implementations, each second set of selectable elements of the input widget is associated with a respective location for a given group of monitored assets.

In some implementations, the input widget comprises a third set of selectable elements, wherein each third set of selectable elements is associated with a member selected from the group consisting of a geographic area, a geographic site, a geographic region, a company subdivision, and a company.

In another aspect, the present disclosure provides a system comprising: a processor; and a memory, the memory storing instructions that, when executed by the processor, cause the processor to: provide, at a client-side application, a graphical user interface having one or more rendering widgets and an input widget (e.g., a tree structure) having one or more levels, wherein the one or more rendering widgets present data associated with a plurality of monitored assets; transmit, by the client-side application, to a data content source, a request for a data set, wherein the dataset is associated with a plurality of monitored assets (e.g., wherein the monitored assets are monitored on a periodic or event-based basis); receive, by the client-side application, the data set, wherein the data set is organized in a multi-level hierarchy corresponding to the one or more levels of the input widget; and responsive to a selection of a level of the one or more levels (e.g., a selection by a user via a user interface device), display via the one or more rendering widgets data associated with the selected level of the input widget from the dataset.

In some implementations, one or more of the plurality of monitored assets are monitored on a periodic or event-based basis.

In some implementations, the rendering widgets are associatively linked to one or more data content sources at a development workspace used to define the rendering widgets.

In some implementations, the instructions, when executed by the processor, cause the processor to receive, by the client-side application, an alert of an updated data set, wherein the alert causes, at the client-side application, a transmission of a request for the updated data set.

In some implementations, the instructions, when executed by the processor, cause the processor to: receive a second selection at the input widget corresponding to a second level of the input widget, wherein the second selection causes the client-side application to render data from a portion of the multi-level hierarchy corresponding to the second level.

In some implementations, the graphical user interface includes a map widget, wherein the received data set includes data for presentation on the map widget.

In some implementations, the dataset is received, by the client-side application, as a single record set.

In another aspect, the present disclosure provides a non-transitory computer readable medium having instructions stored thereon, wherein the instructions, when executed by the processor, cause the processor to: provide a graphical user interface comprising i) one or more rendering widgets for presentation of data associated with a plurality of monitored assets (e.g., wherein the monitored assets are monitored on a periodic or event-based basis) and ii) an input widget for selection of data for the presentation on the one or more rendering widgets, wherein the input widget comprises a plurality of selectable elements (e.g., presented as a tree diagram), including i) a first set of selectable elements associated with individual monitored assets and ii) a second set of selectable elements associated with groups of one or more monitored assets; receive, via a port, a dataset associated with the plurality of monitored assets, wherein the dataset i) comprises data associated with individual monitored assets corresponding to the first set of selectable elements of the input widget and ii) is organized in a hierarchical structure; and wherein the dataset i) comprises data associated with individual monitored assets corresponding to the first set of selectable elements of the input widget and ii) is organized in a hierarchical structure; and in response to a selection of a selectable element of the input widget (e.g., a selection by a user via a user interface device), present, via the one or more rendering widgets of the graphical user interface, data corresponding to the selection from the dataset.

In some implementations, the monitored assets are monitored on a periodic or event-based basis.

In some implementations, the dataset is received in response to a single request call.

In some implementations, the dataset is received as a single record set.

In some implementations, the dataset is received as a single record set via two or more data streams.

In some implementations, the instructions, when executed by the processor, cause the processor to: receive an alert of an updated data set; and in response to the received alert, cause a transmission of a request call for the updated dataset.

In some implementations, the instructions, when executed by the processor, cause the processor to: in response to a selection of a selectable element of the first set of selectable elements, present data associated with a respective individual monitored asset via the one or more rendering widgets of the graphical user interface.

In some implementations, the instructions, when executed by the processor, cause the processor to: in response to a selection of a selectable element of the second set of selectable elements, present data associated with a respective group of monitored assets via the one or more rendering widgets of the graphical user interface.

In some implementations, the one or more rendering widgets of the graphical user interface comprise a map widget, wherein each received dataset associated with the plurality of monitored assets comprises data associated with a respective location for each individual monitored assets.

In some implementations, the dataset is received in one or more portions, wherein each portion of the one or more portions is cached such that the dataset is made available for presentation upon all portions of the dataset having been received by the client-side application.

In some implementations, each level of the hierarchical structure corresponds to a respective set of selectable elements of the input widget.

In some implementations, the instructions, when executed by the processor, cause the processor to: generate data (e.g., aggregated data) associated with each respective group of monitored assets based on data associated with individual monitored assets collectively forming the respective group.

In some implementations, the received dataset comprises data associated with one or more groups of monitored assets.

In some implementations, each second set of selectable elements of the input widget is associated with a respective location for a given group of monitored assets.

In some implementations, the input widget comprises a third set of selectable elements, wherein each third set of selectable elements is associated with a member selected from the group consisting of a geographic area, a geographic site, a geographic region, a company subdivision, and a company.

In another aspect, the present disclosure provides a non-transitory computer readable medium having instructions stored thereon, wherein the instructions, when executed by a processor, cause the processor to: provide a graphical user interface including one or more rendering widgets and an input widget (e.g., presented in a tree structure) having one or more levels, wherein each of the one or more rendering widgets is associated with one or more data content sources; transmit to a data content source a request for a dataset; receive the data set, wherein the data set is organized in a multi-level hierarchy corresponding to the one or more levels of the input widget, and responsive to a selection of a level of the one or more levels, display, via the one or more rendering widgets, data corresponding to the selected level of the input widget from the dataset.

In some implementations, the input widget is presented as a tree diagram.

In some implementations, the rendering widgets are associatively linked to one or more data content sources at a development workspace used to define the rendering widgets.

In some implementations, the instructions, when executed by the processor, cause the processor to: receive an alert of an updated data set; and responsive to the alert, cause a transmission of a request for the updated data set.

In some implementations, the graphical user interface comprises a map widget, and wherein the received data set includes data for representation on the map widget.

In some implementations, the received data set is associated with an InfoTable.

In another aspect, the present disclosure provides a computer-implemented method for operating a real-time Web application (e.g., a mashup application), the computer-implemented method comprising: providing, at a client-side application executing on a computing device, a graphical user interface comprising one or more rendering widgets for presentation of data associated with a plurality of second computing devices (e.g., monitored assets), wherein the client-side application is defined by a plurality of application definition files (e.g., one or more manifest files) having instructions to invoke a plurality of Web service objects, and wherein the instructions, during runtime, cause retrieval of data from one or more storage computing devices (e.g., data content sources) for presentation on the one or more rendering widgets; receiving, by the client-side application, from the one or more storage computing devices, one or more datasets corresponding to the invoked Web service objects; responsive to receipt of the one or more datasets, caching, by the client-side application, each of the received one or more datasets; and responsive to the received one or more datasets being cached, presenting, by the client-side application, data of the cached one or more datasets via the one or more rendering widgets.

In some implementations, the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

In some implementations, a multi-level dataset of the one or more multi-level datasets is received in two or more data streams (e.g., packets or message portions).

In some implementations, the graphical user interface comprises an input widget for selection of data for the presentation via the one or more rendering widgets, wherein the input widget comprises a plurality of selectable elements (e.g., presented as a tree diagram), and wherein a first set of selectable elements of the input widget is associated with individual monitored and a second set of selectable elements of the input widget is associated with groups of monitored assets.

In some implementations, the input widget is presented as a tree diagram.

In some implementations, the method also includes storing, by the client-side application, the data of the one or more rendering widgets in persistent memory.

In some implementations, the method also includes receiving, by the client-side application, a manifest file listing one or more updated application definition files (e.g., via one or more manifest files) having second instructions to invoke a second plurality of plurality of Web service objects; responsive to receipt of the manifest file, retrieving, by the client-side application, the one or more updated application definition files listed in the manifest file; responsive to receipt of the one or more updated application definition files, caching, by the client-side application, each of the received one or more updated application definition files; and responsive to the received one or more updated application definition files being cached, updating, by the client-side application, the plurality of application definition files with the cached one or more updated application definition files.

In some implementations, the step of updating comprises storing the cached one or more updated application definition files in persistent memory.

In some implementations, the step of updating is performed in a transactional manner.

In another aspect, the present disclosure provides a system comprising: a processor and a memory having instructions stored therein, wherein the instructions, when executed by the processor, cause the processor to: provide a graphical user interface comprising one or more rendering widgets for presentation of data associated with a plurality monitored assets, wherein the client-side application is defined by a plurality of application definition files (e.g., one or more manifest files) having a set of instructions to invoke a plurality of Web service objects, and wherein the set of instructions, during runtime, cause retrieval of data from one or more storage computing devices (e.g., data content sources) for presentation on the one or more rendering widgets; receive one or more datasets corresponding to the invoked Web service objects; responsive to receipt of the one or more datasets, caching each of the received one or more datasets; and responsive to the received one or more datasets being cached, present data of the cached one or more datasets via the one or more rendering widgets.

In some implementations, the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

In some implementations, a multi-level dataset of the one or more multi-level datasets is received in two or more data streams (e.g., packets or message portions).

In some implementations, the graphical user interface comprises an input widget for selection of data for the presentation via the one or more rendering widgets, wherein the input widget comprises a plurality of selectable elements (e.g., presented as a tree diagram), and wherein a first set of selectable elements of the input widget is associated with individual monitored assets and a second set of selectable elements of the input widget is associated with groups of monitored assets.

In some implementations, the input widget is presented as a tree diagram.

In some implementations, the instructions, when executed by the processor, cause the processor to: store the data of the one or more rendering widgets in persistent memory.

In some implementations, the instructions, when executed by the processor, cause the processor to: receive a manifest file listing one or more updated application definition files (e.g., via one or more manifest files) having second instructions to invoke a second plurality of plurality of Web service objects; responsive to receipt of the one or more manifest file, retrieve the one or more updated application definition files listed in the manifest file; responsive to receipt of the one or more updated application definition files, cache each of the received one or more updated application definition files; and responsive to the received one or more updated application definition files being cached, update the plurality of application definition files with the cached one or more updated application definition files.

In some implementations, the instructions, when executed by the processor, cause the processor to store the updated application definition files in persistent memory following the update of the plurality of application files.

In another aspect, the present disclosure provides a non-transitory computer readable medium having instructions stored thereon, wherein the instructions, when executed by a processor, cause the processor to: provide a graphical user interface comprising one or more rendering widgets for presentation of data associated with a plurality of monitored assets, wherein the client-side application is defined by a plurality of application definition files (e.g., one or more manifest files) having a set of instructions to invoke a plurality of Web service objects, and wherein the set of instructions, during runtime, cause retrieval of data from one or more storage computing devices (e.g., data content sources) for presentation on the one or more rendering widgets; receive one or more datasets corresponding to the invoked Web service objects; responsive to receipt of the one or more datasets, caching each of the received one or more datasets; and responsive to the received one or more datasets being cached, present data of the cached one or more datasets via the one or more rendering widgets.

In some implementations, the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

In some implementations, a multi-level dataset of the one or more multi-level datasets is received in two or more data streams (e.g., packets or message portions).

In some implementations, the graphical user interface comprises an input widget for selection of data for the presentation via the one or more rendering widgets, wherein the input widget comprises a plurality of selectable elements (e.g., presented as a tree diagram), and wherein a first set of selectable elements of the input widget is associated with individual monitored assets and a second set of selectable elements of the input widget is associated with groups of monitored assets.

In some implementations, the input widget is presented as a tree diagram.

In some implementations, the instructions, when executed by the processor, cause the processor to: store the data of the one or more rendering widgets in persistent memory.

In some implementations, the instructions, when executed by the processor, cause the processor to: receive a manifest file listing one or more updated application definition files (e.g., via one or more manifest files) having second instructions to invoke a second plurality of plurality of Web service objects; responsive to receipt of the one or more manifest file, retrieve the one or more updated application definition files listed in the manifest file; responsive to receipt of the one or more updated application definition files, cache each of the received one or more updated application definition files; and responsive to the received one or more updated application definition files being cached, update the plurality of application definition files with the cached one or more updated application definition files.

In some implementations, the instructions, when executed by the processor, cause the processor to store the updated application definition files in persistent memory following the update of the plurality of application files.

In another aspect, the present disclosure provides a computer-implemented method for operating a real-time Web application (e.g., a mashup application), the computer-implemented method comprising: providing a client-side application executing on a computing device, wherein the client-side application includes a plurality of Web page definition files having a plurality of composite Web service objects, wherein the plurality of composite Web service objects include a first composite Web service object and a second composite Web service object, and wherein the first composite Web service object is associatively linked to a first data service from a first data source, and the second composite Web service object is associative linked to a second data service from a second data source; receiving, from the first data source, a first updated data content of the first data service; caching the first updated data content in a memory of the computing device; and if a second updated data content of the second data service is received from the second data source, retrieving the first updated data content from the memory and updating the plurality of composite Web service objects of the plurality of Web page definition files using the first update data content and the second update data content.

In some implementations, updating the plurality of composite Web service objects with the first and second update data contents is performed in a transactional manner.

In some implementations, the first data service and the second data service include at least one file selected from the group consisting of a Javascript file, an HTML file, an image file, and a Web-mashup definition file.

In some implementations, the first composite Web service object is associatively linked to the first data service by a development workspace that defined the first composite Web service object, wherein the second composite Web service object has been associatively linked to the second data service by the development workspace.

In some implementations, the development workspace includes a second graphical user interface, wherein the second graphical user interface includes a selectable input presented as a wire diagram, wherein the diagram links a first graphical widget representing the first composite Web service object to a second graphical widget representing an application protocol interface (API) associated with the first data source.

In some implementations, at least one of the plurality of composite Web service objects includes a plurality of presentation states, the plurality of presentation states including a first state and a second state, wherein the first state is associatively linked to a third data service from a third data source, wherein the second state is associatively linked to a fourth data service from a fourth data source, and wherein updating of the plurality of composite Web service objects of the plurality of Web page definition files occurs in response to receipt of a third update data of the third data service and receipt of a fourth update data of the fourth data service being received.

In another aspect, the present disclosure provides a non-transitory computer readable medium having instructions stored thereon, wherein the instructions, when executed by a processor, cause the processor to: provide a client-side application, wherein the client-side application includes a plurality of Web page definition files having a plurality of composite Web service objects, wherein the plurality of composite Web service objects include a first composite Web service object and a second composite Web service object, and wherein the first composite Web service object is associatively linked to a first data service from a first data source, and the second composite Web service object is associative linked to a second data service from a second data source; receive, from the first data source, a first updated data content of the first data service; cache the first updated data content in memory; and if a second updated data content of the second data service is received from the second data source, retrieve the first updated data content from the memory and updating the plurality of composite Web service objects of the plurality of Web page definition files using the first update data content and the second update data content.

In some implementations, the first data service and the second data service include at least one file selected from the group consisting of a Javascript file, an HTML file, an image file, and a Web-mashup definition file.

In some implementations, the first composite Web service object is associatively linked to the first data service by a development workspace that defined the first composite Web service object, and wherein the second composite Web service object is associatively linked to the second data service by the development workspace.

In some implementations, the development workspace includes a second graphical user interface, wherein the second graphical user interface includes an input presented as a wire diagram linking a first graphical widget representing the first composite Web service object to a second graphical widget representing an application protocol interface (API) associated with the first data source.

In some implementations, at least one of the plurality of composite Web service objects includes a plurality of presentation states, the plurality of presentation states including a first state and a second state, wherein the first state is associatively linked to a third data service from a third data source, the second state having been associatively linked to a fourth data service from a fourth data source, and wherein updating of the plurality of composite Web service objects of the plurality of Web page definition files occurs in response to receipt of a third update data of the third data service and receipt of a fourth update data of the fourth data service being received.

In another aspect, the present disclosure provides a system comprising: a processor; and a memory having instructions stored thereon, wherein the instructions, when executed by the processor, cause the processor to: provide a client-side application, wherein the client-side application includes a plurality of Web page definition files comprising a plurality of composite Web service objects, wherein the plurality of composite Web service objects comprise a first composite Web service object and a second composite Web service object, and wherein the first composite Web service object is associatively linked to a first data service from a first data source, and the second composite Web service object is associative linked to a second data service from a second data source; receive, from the first data source, a first updated data content of the first data service; cache the first updated data content in the memory; and if a second updated data content of the second data is received from the second data source, retrieve the first updated data content from the memory and updating the plurality of composite Web service objects of the plurality of Web page definition files using the first update data content and the second update data content.

In some implementations, updating the plurality of composite Web service objects with the first and second update data contents is performed in a transactional manner.

In some implementations, the first data service and the second data service includes at least one file selected from the group consisting of a Javascript file, an HTML file, an image file, and a Web-mashup definition file.

In some implementations, the first composite Web service object is associatively linked to the first data service by a development workspace that defined the first composite Web service object, wherein the second composite Web service object is associatively linked to the second data service by the same development workspace.

In some implementations, the development workspace comprises a second graphical user interface, the second graphical user interface including a selectable input presented as a wire diagram, wherein the diagram links a first graphical widget representing the first composite Web service object to a second graphical widget representing an application protocol interface (API) associated with the first data source.

In some implementations, at least one of the plurality of composite Web service objects includes a plurality of presentation states, the plurality of presentation states including a first state and a second state, wherein the first state is associatively linked to a third data service from a third data source, wherein the second state is associatively linked to a fourth data service from a fourth data source, and wherein updating of the plurality of composite Web service objects of the plurality of Web page definition files occurs in response to receipt of a third update date of the third data service and receipt of a fourth update data of the fourth data service being received.

In another aspect, the present disclosure provides a computer-implemented method for developing real-time Web applications for multiple computing platforms in a heterogeneous environment, the computer-implemented method comprising: providing, by a first computing device, a development workspace for a set of Web page definition files for running on a plurality of client-side applications (e.g., testing applications), wherein the development workspace combines a plurality of composite Web service objects (e.g., mashup elements) to create the set of Web page definition files for presentation of data on one or more renderable objects having a plurality of presentation states (e.g., nested Mashup), wherein the one or more renderable objects are defined by the set of Web page definition files, and wherein the plurality of client-side applications are configured to run on a plurality of second computing devices composing a heterogeneous environment (e.g., test computing devices running different types of operating systems, rendering modes, etc.); storing, responsive to a save command being received by an input at the development workspace, a set of modified Web page definition files (e.g., updated test application files), wherein the set of modified Web page definition files include at least one modification of at least one of the plurality of composite Web service objects from a set of current Web page definition files associated with a previous save command; and transmitting a message, in response to the save command, to each of the plurality of client-side applications running on the plurality of second computing devices, wherein the message causes each of the plurality of client-side applications to receive the set of modified Web page definition files, and wherein the receiving of the set of modified Web page definition files occurs without input at the client-side application, and wherein an update of the modified Web page definition files results in presentation of the data at a last known presentation state, and wherein an update of the modified Web page definition files results in presentation, by the client-side application, of one or more renderable objects at a last known presentation state prior to the update.

In some implementations, the modified Web page definition files include one or more status information associated with a member selected from the group consisting of a development status, testing status, production status, and runtime status.

In some implementations, the plurality of composite Web service objects, during runtime, cause presentation of data on one or more nested Mashups.

In some implementations, responsive to the save command, a given client-side application of the plurality of client-side applications receives a plurality of artifacts and data content associatively linked to the set of modified Web page definition files by the development workspace.

In some implementations, a composite Web service object of the plurality of composite Web service objects aggregates content or services from a plurality of content sources.

In some implementations, the composite Web service object includes a service selected from a group consisting of a map service, a calendar service, a data stream service, a wiki page service, and a portal service.

In some implementations, the plurality of client-side applications operate on an operating system selected from a group consisting of Android, OSX, iOS, Windows Phone, Windows Mobile, Blackberry, Sailfish OS, Ubuntu Touch, and Tizen.

In some implementations, the client-side application is executed within a member selected from the group consisting of a Web-browser and an embedded web browser (e.g., an embedded web browser frame, for example, Chromium Embedded Framework).

In another aspect, the present disclosure provides a system for developing real-time Web applications for multiple computing platforms in a heterogeneous environment, the system comprising: a processor; and a memory having instructions stored thereon, wherein the instructions, when executed by the processor, cause the processor to: provide a development workspace for a set of Web page definition files for running on a plurality of client-side applications (e.g., testing applications), wherein the development workspace combines a plurality of composite Web service objects (e.g., mashup elements) to create the set of Web page definition files for presentation of data on one or more renderable objects having a plurality of presentation states (e.g., nested Mashup), wherein the one or more renderable objects are defined by the set of Web page definition files, and wherein the plurality of client-side applications are configured to run on a plurality of second computing devices composing a heterogeneous environment (e.g., test computing devices running different types of operating systems, rendering modes, etc.); store, responsive to a save command being received by an input at the development workspace, a set of modified Web page definition files, the set of modified Web page definition files including at least one modification of at least one of the plurality of composite Web service objects from a set of current Web page definition files associated with a previous save command; and transmit a message, in response to the save command, to each of the plurality of client-side applications running on the plurality of computing devices, wherein the message causes each of the plurality of client-side applications to receive the set of modified Web page definition files, and wherein an update of the modified Web page definition files results in presentation of the data at a last known presentation state, and wherein an update of the modified Web page definition files results in presentation, by the client-side application, of one or more renderable objects at a last known presentation state prior to the update.

In some implementations, the modified Web page definition files include one or more status information associated with a member selected from the group consisting of a development status, testing status, production status, and runtime status.

In some implementations, transmitting the message to each of the plurality of client-side applications causes the each client-side application to update a set of current Web page definition files of the respective client-side application with the corresponding set of modified Web page definition files, wherein the updates occur without input at the client-side application.

In some implementations, responsive to the save command, a given client-side application of the plurality of client-side applications receives a plurality of artifacts and data content associatively linked to the set of modified Web page definition files by the development workspace.

In some implementations, a composite Web service object of the plurality of composite Web service objects aggregates content or services from a plurality of content sources.

In some implementations, the composite Web service object includes a service selected from a group consisting of a map service, a calendar service, a data stream service, a wiki page service, and a portal service.

In some implementations, the client-side application is rendered in a member selected from the group consisting of a Web-browser and an embedded web browser (e.g., an embedded browser frame, such as Chromium Embedded Framework).

In another aspect, the present disclosure provides a non-transitory computer readable medium having instructions stored thereon, wherein the instructions, when executed by a processor, cause the processor to: provide a development workspace for a set of Web page definition files for running on a plurality of client-side applications (e.g., testing applications), wherein the development workspace combines a plurality of composite Web service objects for the set of Web page definition files, and wherein the development workspace combines a plurality of composite Web service objects (e.g., mashup elements) to create the set of Web page definition files for presentation of data on one or more renderable objects having a plurality of presentation states (e.g., nested Mashup), wherein the one or more renderable objects are defined by the set of Web page definition files, and wherein the plurality of client-side applications are configured to run on a plurality of second computing devices composing a heterogeneous environment (e.g., test computing devices running different types of operating systems, rendering modes, etc.); store, responsive to a save command being received by an input at the development workspace, a set of modified Web page definition files, the set of modified Web page definition files including at least one modification of at least one of the plurality of composite Web service objects from a set of current Web page definition files associated with a previous save command; and transmit a message, in response to the save command, to each of the plurality of client-side applications running on the plurality of second computing devices, wherein the message causes each of the plurality of client-side applications to receive the set of modified Web page definition files, and wherein an update of the modified Web page definition files results in presentation, by the client-side application, of one or more renderable objects at a last known presentation state prior to the update.

In some implementations, the modified Web page definition files include one or more status information associated with a member selected from the group consisting of a development status, testing status, production status, and runtime status.

In some implementations, the plurality of composite Web service objects, during runtime, cause presentation of data on one or more nested Mashups.

In some implementations, responsive to the save command, a given client-side application of the plurality of client-side applications receives a plurality of artifacts and data content associatively linked to the set of modified Web page definition files by the development workspace.

In some implementations, a composite Web service object of the plurality of composite Web service objects aggregates content or services from a plurality of content sources.

In some implementations, the composite Web service object includes a service selected from the group consisting of a map service, a calendar service, a data stream service, a wiki page service, and a portal service.

In some implementations, the client-side application is rendered in a member selected from the group consisting of a Web-browser and an embedded web browser (e.g., an embedded browser frame, such as Chromium Embedded Framework).

In another aspect, the present disclosure provides a computer-implemented method for testing software application, the method comprising: providing a client-side application running on a computing device, wherein the client-side application uses one or more Web page definition files to display a plurality of composite Web service objects; receiving one or more updated Web page definition files, wherein the one or more updated Web page definition files include an update of at least one of the plurality of composite Web service objects within the Web page definition files, and wherein the at least one of plurality of composite Web service objects comprises a plurality of presentation states; receiving a data set having content information to populate the plurality of presentation states of the at least one of the plurality of composite Web service objects, wherein the data set is organized in a hierarchical structure, wherein each level of the hierarchical structure comprises one or more markers; for each of the plurality of composite Web service objects being displayed, determining a marker path of a set of markers associated with a current presentation state; updating the Web page definition files with the updated composite Web service objects; and displaying each of the updated composite Web service objects of the updated Web page definition files at the current presentation state using the determined marker path (e.g., by traversing the plurality of presentation states to the current presentation state).

In some implementations, the dataset is concurrently received with the updated Web page definition files. In some implementations, the dataset is received based on a retrieval service invoked by instructions associated with the updated Web page definition files.

In another aspect, the present disclosure provides a system comprising: a processor; and a memory having instructions stored thereon, wherein the instructions, when executed by the processor, cause the processor to: provide a client-side application, wherein the client-side application uses one or more Web page definition files to display a plurality of composite Web service objects; receive one or more updated Web page definition files, wherein the one or more updated Web page definition files include an update of at least one of the plurality of composite Web service object within the Web page definition files, wherein the at least one of plurality of composite Web service objects comprises a plurality of presentation states; receive a data set having content information to populate the plurality of presentation states of the at least one of the plurality of composite Web service objects, wherein the data set is organized in a hierarchical structure, and wherein each level of the hierarchical structure comprises one or more markers; for each of the plurality of composite Web service objects being displayed, determine a marker path of a set of markers associated with a current presentation state; update the Web page definition files with the updated composite Web service objects; and display each of the updated composite Web service objects of the updated Web page definition files at the current presentation state using the determined marker path (e.g., by traversing the plurality of presentation states to the current presentation state).

In some implementations, the dataset is concurrently received with the updated Web page definition files. In some implementations, the dataset is received based on a retrieval service invoked by instructions associated with the updated Web page definition files.

In another aspect, the present disclosure provides a non-transitory computer readable medium having instructions stored thereon, wherein the instructions, when executed by a processor, cause the processor to: provide a client-side application, wherein the client-side application uses one or more Web page definition files to display a plurality of composite Web service objects; receive one or more updated Web page definition files, wherein the one or more updated Web page definition files include an update of at least one of the plurality of composite Web service object within the Web page definition files, wherein the at least one of plurality of composite Web service objects comprises a plurality of presentation states; receive a data set having content information to populate the plurality of presentation states of the at least one of the plurality of composite Web service objects, wherein the data set is organized in a hierarchical structure, and wherein each level of the hierarchical structure comprises one or more markers; for each of the plurality of composite Web service objects being displayed, determine a marker path of a set of markers associated with a current presentation state; update the Web page definition files with the updated composite Web service objects; and display each of the updated composite Web service objects of the updated Web page definition files at the current presentation state using the determined marker path (e.g., by traversing the plurality of presentation states to the current presentation state).

In some implementations, the dataset is concurrently received with the updated Web page definition files.

In some implementations, the dataset is received based on a retrieval service invoked by instructions associated with the updated Web page definition files.

In some implementations, the present disclosure describes a method of developing real-time Web applications for multiple platforms in a heterogeneous environment. Different platforms being tested may be updated via a single input (e.g., a save command). The client-side application and associated real-time content are loaded on to one or more test platforms without the developer having to reload the client-side application at each respective test platform. The real-time application and content may be pushed from the development workspace to each respective platform; or, a command/message may be sent to the respective platform to pull of the application and content from the development workspace.

The development workspace reduces the time needed to develop real-time Web applications and minimizes the barrier for users to develop such real-time Web applications. The development platform provides tools to enable developers to more efficiently test real-time Web applications without having to rely on a separate team of testers and without having to set up a source for the real-time content to test the proper operation of the real-time Web application.

The development workspace provides a set of Web page definition files (e.g., one or more CSS files, XML definition files, JavaScript files, and/or configuration files) for running on one or more client-side applications. The client-side applications are configured to run on a set of connected platforms in a heterogeneous environment.

The development workspace combines composite Web service objects (e.g., mashups) to create the set of Web page definition files. The composite Web service objects include widget elements and mashup elements. The composite Web service objects aggregate information content or services from a number of content sources. A widget may be an application or the like that is programmed to perform particular functions. In some example implementations, widgets are executed via Web pages. The composite Web service objects (e.g., mashups) may also include a content-source service selected from a group consisting of a map service, a calendar service, a data stream service, a wiki page service, and a portal service. Content sources may be selected from a group consisting of public Web service API, a third-party Web service API, a Web-widget library, a Web-toolkit library, a screen scraping of a Web-site, a local database, and a Wiki page.

The composite Web service object may also include content sources from enterprise resources and enterprise-based applications and/or data (e.g., from Enterprise back-office servers). The composite Web service object may also include content from storage servers and database warehouses. A portion of the content sources may include data associated with one or more connected devices or a machine-to-machine systems.

The composite Web service objects (e.g., mashups) may employ compiled binaries (e.g., C/C++, Objective-C, Lisp, Pascal), scripts (e.g., Tkl, Python, Perl), and/or interpreted objects (e.g., Visual Basic, Java) to access content from a real-time data source. The composite Web service objects (e.g., mashups) may communicate with a real-time data source using standard protocols, such as, but not limited to, simple object access protocol (SOAP), remote procedure call using Extensible Markup Language (XML-RPC), remote procedure call using JavaScript Object Notation (JSON-RPC), Representational State Transfer (REST), and/or API available to a web-browser scripting language (XMLHTTPRequest).

The development workspace stores, a set of modified Web page definition files in response to a save command being received at the development workspace. The set of modified Web page definition files includes at least one modification of at least one of the composite Web service objects from a set of current Web page definition files associated with a previous save command. The save command is associated with the persistent storage (i.e., in persistent memory) of project files, program files, and/or configuration files of a client-side application. In some embodiments, the save command is further associated with the compilation, build, translation, assembly, and/or evaluation of the project files, program files, and/or configuration files in connection with the generation of Web page definition files.

The method also includes causing, by a processor responding to the save command, a message (e.g., a Web page-definition-files update-message) to be transmitted to each of the client-side applications executing on the set of connected platforms. The message may include an indicator of a new version of the Web page-definition-files, a version number of the Web page-definition-files, and/or a request for the client-side application to compare the current Web page-definition-file version to the latest available version.

In some implementations, the client-side application is executed within a Web-browser. The message causes each of the client-side applications to receive the set of modified Web page definition files without any input by a user at the client-side application. In some embodiments, the set of modified Web page definition files are pushed to the computing device along with the message. In other embodiments, the message is pushed to the computing device and causes a client-side application executing thereon to pull the set of modified Web page definition files from a predefined source.

In some implementations, the method includes causing the client-side application to update the set of current Web page definition files with the set of modified Web page definition files, in response to receiving the set of modified Web page definition files. The update may occur without any input by the user at the client-side application. The method may include causing the client-side application to display the last retained view being display prior to the update.

In some implementations, the set of Web page definition files may be configured to produce a number of presentation states in the composite Web service objects. A presentation state includes a user interface associated with the presentation of a given data set of a multi-level and/or hierarchical data set. The client-side applications may determine a current presentation state being displayed by the set of current Web page definition files. During a new update distribution, the client-side application may update the set of modified Web page definition files and traverse the presentation states to the current presentation state.

In some implementations, the present disclosure describes a system for developing real-time Web application for multiple platforms in a heterogeneous environment. The system includes a processor and a memory, where the memory stores instructions that, when executed by the processor, cause the processor to provide a development workspace for a set of Web page definition files for running on one or more client-side applications. The client-side applications are configured to run on a set of connected platforms composing a heterogeneous environment.

The development workspace combines composite Web service objects to create the set of Web page definition files. The composite Web service objects include widget elements and mashup elements. The composite Web service also includes Web service aggregate information content or services from a number of content sources. The composite Web service objects may also include a content-source service selected from a group consisting of a map service, a calendar service, a data stream service, a wiki page service, and a portal service.

The instructions further cause the processor to store a set of modified Web page definition files in response to a save command being received by the development workspace. The set of modified Web page definition files includes at least one modification of at least one of the composite Web service objects from a set of current Web page definition files associated with a previous save command.

The instructions further cause a message to be transmitted to each of the client-side applications in response to the save command. In some implementations, the client-side application is executed within a Web-browser. The message causes each of the client-side applications to receive the set of modified Web page definition files without any input by a user at the client-side application. In some embodiments, the set of modified Web page definition files are pushed to the computing device along with the message. In other embodiments, the message is pushed to the computing device and causes a client-side application executing thereon to pull the set of modified Web page definition files from a predefined source.

In some implementations, the instructions further cause the client-side application to update the set of current Web page definition files using the set of modified Web page definition files. The update may occur without any input by the user at the client-side application. The method may include causing the client-side application to display the last retained view being display prior to the update.

In some implementations, the set of Web page definition files are configured to produce a number of presentation states in the composite Web service objects. The client-side applications may determine a current presentation state being displayed at the set of current Web page definition files. During a new update distribution, the client-side application may update the set of modified Web page definition files and traverse the presentation states to the same current presentation state.

In some implementations, the present disclosure describes a non-transitory computer readable medium for operating the above-discussed method of developing real-time Web applications for multiple platforms in a heterogeneous environment. The computer readable medium has instructions stored thereon, where the instructions, when executed by a processor, cause the processor to provide a development workspace for a set of Web page definition files, for running on one or more client-side applications. The client-side applications are configured to run on a set of connected platforms in a heterogeneous environment.

The development workspace combines one or more composite Web service objects to create the set of Web page definition files. The composite Web service objects include widgets elements and/or mashup elements. The composite Web service objects also include Web service aggregate information content or services from a number of content sources. The composite Web service objects may include a content-source service selected from a group consisting of a map service, a calendar service, a data stream service, a wiki page service, and a portal service.

The instructions further cause the processor to store a set of modified Web page definition files in response to a save command being received by the development workspace. The set of modified Web page definition files may include at least one modification of at least one of the composite Web service objects from a set of current Web page definition files associated with a previous save command.

The instructions further cause a message to be transmitted to each of the client-side applications in response to the save command. In some implementations, the client-side application is executed within a Web-browser. The message causes each of the client-side applications to receive the set of modified Web page definition files without any input by a user at the client-side application.

The instructions further cause the client-side application to update the set of current Web page definition files using the set of modified Web page definition files. The updating may occur without any input by the user at the client-side application. The method further includes causing the client-side application to display the last retained view being display prior to the update.

In some implementations, the set of Web page definition files, when executed on the client-side application, creates a number of presentation states of the composite Web service objects. The client-side applications may determine a current presentation state being displayed at the set of current Web page definition files. During a new update distribution, the client-side application may update the set of modified Web page definition files and traverse the presentation states to the current presentation state.

In some implementations, the present disclosure describes a method of updating software distributions at a client-side application. The method includes providing a client-side application running on a connected device. The client-side application uses Web page definition files to display one or more composite Web service objects. The method also includes receiving updated Web page definition files including an update of at least one composite Web service object within the Web page definition files. The composite Web service objects include a number of presentation states. The method also includes receiving, concurrent with the updated Web page definition files, a structured data-table having content information to populate the presentation states of the at least one of the composite Web service objects. The structured data-table comprises a set of markers. For each of the composite Web service objects being displayed, the method also includes determining a path of the set of markers associated with a current presentation state. The method includes updating the Web page definition files with the updated composite Web service objects. The method also includes displaying each of the updated composite Web service objects of the updated Web page definition files at the current presentation state, using the determined marker path.

In some implementations, the present disclosure describes a system for executing the above method of updating software distribution at a client-side application. The system includes a processor and a memory having instructions stored thereon, where the instructions, when executed by the processor, cause the processor to: provide a client-side application running on a connected device, the client-side application using Web page definition files to display a plurality of composite Web service objects; receive updated Web page definition files including an update of at least one composite Web service object within the Web page definition files, where the at least one of the plurality of composite Web service objects includes a plurality of presentation states; receive, concurrent with the updated Web page definition files, a structured data-table having content information to populate the plurality of presentation states of the at least one of the composite Web service objects, where the structured data-table includes a set of markers; for each of the plurality of composite Web service objects being displayed, determine a path of the set of markers associated with a current presentation state; update the Web page definition files using the updated composite Web service objects; and display each of the updated composite Web service objects of the updated Web page definition files at the current presentation state using the determined marker path.

In some implementations, the present disclosure describes a non-transitory computer-readable medium for executing the above method of updating software distribution at a client-side application. The computer readable medium includes instructions stored thereon, where the instructions, when executed by the processor, cause the processor to: provide a client-side application running on a connected device, the client-side application using Web page definition files to display a plurality of composite Web service objects; receive updated Web page definition files including an update of at least one composite Web service object within the Web page definition files, where the at least one of plurality of composite Web service objects includes a plurality of presentation states; receive, concurrent with the updated Web page definition files, a structured data-table having content information to populate the plurality of presentation states of the at least one of the composite Web service objects, where the structured data-table includes a set of markers; for each of the plurality of composite Web service objects being displayed, determine a path of the set of markers associated with a current presentation state; update the Web page definition files with the updated composite Web service objects; and display each of the updated composite Web service objects of the updated Web page definition files at the current presentation state using the determined marker path.

In some implementations, the present disclosure describes a method of caching real-time Web data and Web service operations at a client-side application. The technology improves the performance of the real-time Web applications by allowing instances and portions of real-time Web data to be cached (e.g., along with updated client-side application files). Consequently, the real-time Web application can display (e.g., present) the updated real-time Web data when the data set of the real-time Web data is available (e.g., received at the respective computing device). The caching allows the real-time Web application to operate smoothly to improve the user experience when viewing and using the real-time Web data. In addition, the caching allows the real-time Web application to operate in an environment where connectivity to the source of the real-time Web data is intermittent and/or sporadic.

The technology further simplifies the implementation of such caching operations. As opposed to having to manually partition or designate the real-time Web data in to portions, the technology performs such partitioning and/or designation of portions of instances of the real-time Web data as a background process performed by the development platform. The technology employs actions of the developer/user during programming of the client-side application (e.g., when linking the real-time Web data with a composite Web service object of the given client-side application) to designate the real-time Web data for such caching operations.

The method includes providing a client-side application running on a connected device, where the client-side application has one or more Web page definition files. The Web page definition files have composite Web service objects (e.g., mashups), including a first composite Web service object and a second composite Web service object. The first composite Web service object is associatively linked to a first data service from a first data source, and the second composite Web service object is associative linked to a second data service from a second data source. The linking is made at a graphical user interface having an input represented as a wire diagram that links a first graphical widget representing the first composite Web service object to a second graphical widget representing an API associated with the first data source.

The method also includes receiving a first updated data content of the first data service from the first data source. The first updated data content may be listed in a manifest file. Examples of the first updated data content includes, for example, but not limited to, JavaScript object, an HTML object, an image, a Web-mashup definition, a Web-mashup artifact, InfoTable and/or relational table data, and time series data stream.

The method also includes caching the first updated data content in memory (e.g., if other files in the manifest file are not present).

The method also includes, upon receiving a second updated data content of the second data service from the second data source, retrieving the first updated data content from memory and updating the composite Web service objects of the Web page definition files using the first and second update data contents. Updates of the composite Web service objects may be performed in a transactional manner (e.g., the updates are effected when all the cached elements are present and confirmed, by the client-side application, to be valid).

At least one of the composite Web service objects may include one or more presentation states, including a first state and a second state in which the first state is associatively linked to a third data service from a third data source, and the second state is associatively linked to a fourth data service from a fourth data source. In some embodiments, the update occurs only upon a third update of the third data service and a fourth update of the fourth data service being received. In other embodiments, the update occurs upon all packets of the third and fourth data service being received, where the packets are partitioned by size or by file.

In some implementations, the present disclosure describes a system for executing the above-discussed method of caching real-time Web data and Web services operations at a client-side application. The system includes a processor and a memory, the memory storing instructions that, when executed by the processor, cause the processor to provide a client-side application running on a connected device. The client-side application may have a number of Web page definition files, where the Web page definition files have a number of composite Web service objects, including a first composite Web service object and a second composite Web service object. The first composite Web service object is associatively linked to a first data service from a first data source, and the second composite Web service object is associative linked to a second data service from a second data source. The linking is made at a graphical user interface via an input represented as a wire diagram that links a first graphical widget representing the first composite Web service object to a second graphical widget representing an API associated with the first data source.

The instructions further cause the processor to receive a first updated data content of the first data service from the first data source. The first updated data content may be listed in a manifest file. Examples of the first updated data content includes, for example, but not limited to, JavaScript object, an HTML object, an image, a Web-mashup definition, and a Web-mashup artifact. The instructions further cause the processor to cache the first updated data content in memory if other files in the manifest file are not present. The instructions further cause the processor to receive a second updated data content of the second data service from the second data source; retrieve the first updated data content from memory and update the composite Web service objects of the Web page definition files with the first and second update data contents. Updates of the composite Web service objects may be performed in a transactional manner.

In some implementations, the present disclosure describes a non-transitory computer readable medium for executing the above method of caching real-time Web data and Web services operations at a client-side application. The computer readable medium has instructions stored thereon, where the instructions, when executed by a processor, cause the processor to execute a client-side application running on a connected device, where the client-side application has a number of Web page definition files. The Web page definition files have a number of composite Web service objects, including a first composite Web service object and a second composite Web service object. The first composite Web service object is associatively linked to a first data service from a first data source, and the second composite Web service object is associative linked to a second data service from a second data source. The linking is made at a graphical user interface having an input represented as a wire diagram that links a first graphical widget representing the first composite Web service object to a second graphical widget representing an API associated with the first data source. The instructions further cause the processor to receive, during runtime of the client-side application, a first updated data content of the first data service from the first data source. The first updated data content may be listed in a manifest file. Examples of the first updated data content includes, for example, but not limited to, JavaScript object, an HTML object, an image, a Web-mashup definition, and a Web-mashup artifact. The instructions further cause the processor to cache the first updated data content in memory if other files in the manifest file are not present. The instructions further cause the processor, upon receiving a second updated data content of the second data service from the second data source, retrieve the first updated data content from memory and updating the composite Web service objects of the Web page definition files with the first and second update data contents. Updates of the composite Web service objects may be performed in a transactional manner.

In some implementations, the present disclosure describes a method of operating the development platform to enable the caching of real-time Web data and Web service operations at a client-side application. In another aspect, the present disclosure describes a system for executing the above-method of operating the development platform to enable the caching of real-time Web data and Web service operations at a client-side application.

In some implementations, the present disclosure describes a non-transitory computer-readable medium for executing the above-method of operating the development platform to enable the caching of real-time Web data and Web service operations at a client-side application.

In some implementations, the present disclosure describes a method of displaying hierarchical data at a client-side application executing on a computing device, also referred to as "client-side cursor." The technology improves the development speed and testing of real-time Web service applications by presenting, at the client-side application, the last nested or sub-level screen upon an update of the client-side application. Consequently, the developer of the client-side application can readily observe the visual and/or functional effects of the last change of the programming of the client-side application. The technology also allows new code (e.g., programmed widgets) to be incrementally implemented in the development workspace, allowing for quicker and simpler debugging of such code during development.

Moreover, the technology enables the client-side application to receive, via a single data service call, a multiple-level/hierarchical record set corresponding to multiple connected devices. Consequently, a request by the user for information regarding another available connected device results in a local access of the multiple-level/hierarchical record set at the client-side application, rather than a service call to the server-side application for the data. The multiple-level/hierarchical record sets are organized, in some implementations, in a tree-format, geographical location data for a map display, and numerical data for gauges.

The method includes providing a graphical user interface running at the client-side application, where the graphical user interface presents one or more rendering widgets and an input widget having one or more levels. Each of the one or more rendering widgets is associated to one or more data content sources. In some embodiments, the graphical user interface presents the input widget as a tree diagram. The rendering widgets may be associatively linked to one or more data content source at a development workspace used to define the rendering widgets. The graphical user interface may include a map widget, where the received data set includes data for each of the levels of the input widget for the map widget. The received data set may be an InfoTable.

The method also includes transmitting, at the client-side application, a request for a multi-level hierarchy data set to the data content source.

The method also includes receiving, at the client-side application, the multi-level hierarchy data set where the data set forms a multi-level hierarchy corresponding to the one or more levels of the input widget and where the data set includes the one or more data content sources associated with the rendering widgets.

The method also includes displaying one or more selected rendering widgets with a data content source where the selected rendering widgets correspond to a selected level of the input widget.

In some implementations, the method further includes receiving, at the client side application, an alert of an updated data set where the alert causes, at the client-side application, a transmission of a request for the updated data set. The method may further include receiving a second input at the input widget corresponding to a second level of the input widget. The second input may cause the client-side application to render data from a portion of the multi-level hierarchy corresponding to the second level.

In some implementations, the present disclosure describes a system for executing the above-discussed method of displaying hierarchical data at a client-side application executing on a computing device. The system includes a processor and a memory, the memory storing instructions that, when executed by the processor, cause the processor to provide a graphical user interface running at the client-side application. The graphical user interface presents one or more rendering widgets and an input widget having one or more levels, where each of the one or more rendering widgets is associated to one or more data content source. The graphical user interface may present the input widget as a tree diagram. The rendering widgets may be associatively linked to one or more data content source at a development workspace used to define the rendering widgets. The graphical user interface may include a map widget where the received data set includes data for each of the levels of the input widget for the map widget. The received data set may be an InfoTable.

The instructions, when executed, further cause the processor to transmit, at the client-side application, a request for a multi-level hierarchy data set associated with the data content source.

In some implementations, the instructions, when executed, further cause the processor to receive, at the client-side application, the multi-level hierarchy data set, where the data set forms a multi-level hierarchy corresponding to the one or more levels of the input widget and where the data set includes the one or more data content sources associated with the rendering widgets. The instructions, when executed, further cause the processor to display one or more selected rendering widgets with a data content source, where the selected rendering widgets correspond to a selected level of the input widget. In some implementations, the instructions, when executed, further cause the processor to receive, at the client side application, an alert of an updated data set, where the alert causes, at the client-side application, a transmission of a request for the updated data set. The instructions, when executed, further cause the processor to receive a second input at the input widget corresponding to a second level of the input widget. The second input may cause the client-side application to render data from a portion of the multi-level hierarchy corresponding to the second level.

In some implementations, the present disclosure describes a non-transitory computer readable medium for executing the above-discussed method of displaying hierarchical data at a client-side application executing on a computing device. The computer readable medium has instructions stored thereon, where the instructions, when executed by a processor, cause the processor to provide a graphical user interface running at the client-side application. The graphical user interface presents one or more rendering widgets and an input widget having one or more levels. Each of the one or more rendering widgets is associated to one or more data content source. The graphical user interface may present the input widget as a tree diagram. The rendering widgets may be associatively linked to one or more data content sources at a development workspace used to define the rendering widgets. The graphical user interface may include a map widget, where the received data set includes data for each of the levels of the input widget for the map widget. The received data set may be an InfoTable.

The instructions, when executed, further cause the processor to transmit, at the client-side application, a request for a multi-level hierarchy data set corresponding to the data content source. The instructions, when executed, further cause the processor to receive, at the client-side application, the multi-level hierarchy data set. The data set forms a multi-level hierarchy corresponding to the one or more levels of the input widget, and includes the one or more data content sources associated with the rendering widgets. The instructions, when executed, further cause the processor to display one or more selected rendering widgets with a data content source where the selected rendering widgets correspond to a selected level of the input widget. In some implementations, the instructions, when executed, further cause the processor to receive, at the client side application, an alert of an updated data set, where the alert causes, at the client-side application, a transmission of a request for the updated data set. The instructions, when executed, may further cause the processor to receive a second input at the input widget corresponding to a second level of the input widget. The second input may cause the client-side application to render data from a portion of the multi-level hierarchy corresponding to the second level.

Elements from embodiments of one aspect of the invention may be used in other aspects of the invention (e.g., elements of claims depending from one independent claim may be used to further specify embodiments of other independent claims). Other features and advantages of the invention will be apparent from the following figures, detailed description, and claims.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
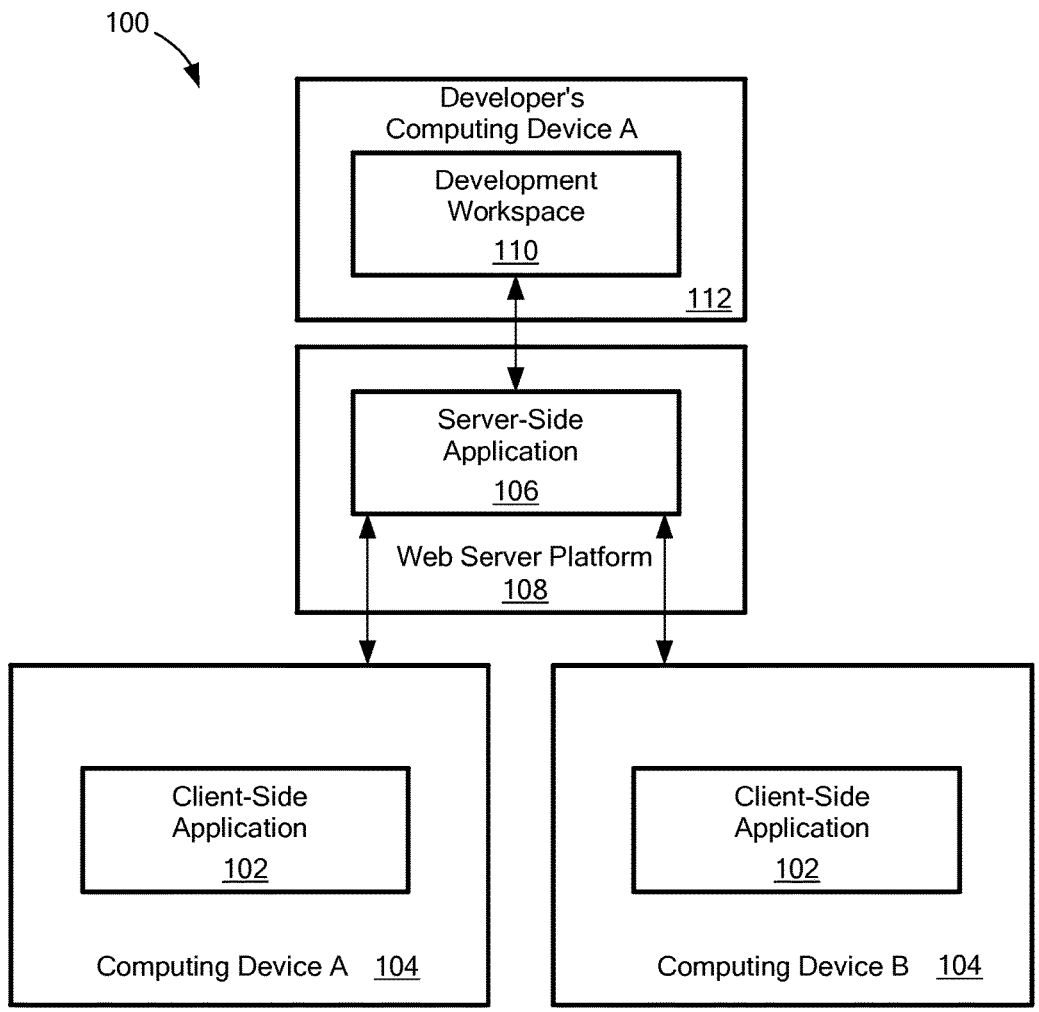
FIG. 1 is a block diagram of an example system for developing applications (e.g., real-time Web applications) for executing on a set of computing devices in accordance with an embodiment of the invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It should be understood that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

Methods and systems are described herein that employs graphical elements for coding and/or programming within a development workspace (e.g., development platform, workspace environment). Such graphical elements may be used to develop, for example, applications and/or Web pages (e.g., for a client-side application) that access, aggregate and manage real-time data and services of different types and structures from multiple heterogeneous sources. The development workspace reduces the time to design, develop, and deploy mashup applications and/or Web pages including real-time data and/or real-time services.

The development workspace includes testing features to improve the speed and user experience of developers during the development of applications to be deployed in a heterogeneous environment (e.g., different operating system). The testing features provide, among other things, the transmission of updated application development files and real-time data to test computing devices, in response to an action being performed in the development workspace (e.g., a save command of changes to a development file).

To improve the efficiency and reduce complexity of the development of client-side applications, the development workspace reduces the number of user operations needed to test applications on or for target devices. In that regard, the development workspace masks (e.g., hides) the underlying device-level interface and code used to connect and upload applications to computing devices (e.g., a mobile device). In some embodiments, when widgets associated with API objects are added to the development workspace, the development workspace associatively links the API objects to access and/or provide access to real-time data and/or services. The development workspace can associate the real-time data with a manifest file. In this way, real-time data may be delivered to a target device together with update or installation files of the client-side application. In addition, the development workspace can partition the real-time data and perform caching operations at the client-side application using that data.

Moreover, in embodiments in which client-side applications include a composite service (e.g., aggregation of services) Web service and/or mashups that employs multi-level, nested, or hierarchical real-time data, the client-side application maintains a client-side cursor to the last state (e.g., presentation state, rendered view) of the composite Web service and/or mashups. The last state may refer to a state prior to when program files (e.g., the Web page definition files) of the client-side application are updated and/or modified. For example, data service calls by client-side applications result in multi-level, nested, or hierarchical real-time data being returned (e.g., transmitted) to the client-side application. The multi-level or nested data may include markers associated with each level within the multi-level data. During an update and/or modification of the client-side application, the client-side application retains a path or address of the markers associated with each respective level. In turn, the new (e.g., updated, modified) client-side application traverses a path through the multi-level, nested, or hierarchical real-time data. Consequently, developers do not have to manually load and traverse through screens and sub-screens of the composite Web service objects of the new (e.g., updated, modified) client-side application in order to view the effects (e.g., impacts, changes, errors) of the last application update and/or modification.

In addition, the multiple-level, nested, or hierarchical real-time data improves the performance of the client-side application by allowing its users to view the data (e.g., sub-level data) of each level of a multi-level, nested, or hierarchical real-time data through a single update event. Consequently, the client-side application can directly access the sub-level data from its cache without having to request the real-time data from its corresponding source.

FIG. 1 is a block diagram of an example system 100 for developing client-side applications 102 (e.g., a real-time Web application) for executing and/or deploying on a set of computing devices 104 in accordance with an embodiment of the invention. The client side applications 102 may be mashup applications, Web applications, real-time applications, and the like. The computing devices 104 may be smart phones, personal digital assistants (PDA), tablet computers, desktop computers, laptop computers, Smart TVs, Internet appliances, or other personal electronic and/or computing devices capable of the installation and execution of a software application designed to display one or more mashup objects.

In some implementations, the system 100 includes a server-side application 106 that executes on a Web server platform 108. The system 100 further includes a development workspace 110 that executes on a developer's computing device 112 (also referred to herein as "development client 112"). The developer's computing device 112 may be a computing device managed and/or operated by an application developer or the like.

In some implementations, the development workspace 110 is a Web service or application that is presented via a Web browser and/or embedded web browser executing on the developer's computing device 112, and is hosted by the server-side application 106. The development workspace 110 may include a graphical user interface for viewing, building and/or testing client-side applications (e.g., client side application 102).

In some implementations, the server-side application 106 communicates with the client-side application 102 and/or development workspace 110 via hypertext transfer protocol secure (HTTPS), secure sockets layers or transport layer security (SSL/TLS), and/or a binary communication protocol that employs secure WebSocket, such as WebSocket Secure (WSS). An example of a binary communication protocol is described in U.S. patent application Ser. No. 14/222,100, titled "System and Method of Using Binary Dynamic REST Messages", and filed Mar. 21, 2014, the contents of which are incorporated herein by reference in their entirety.

Figure 2:
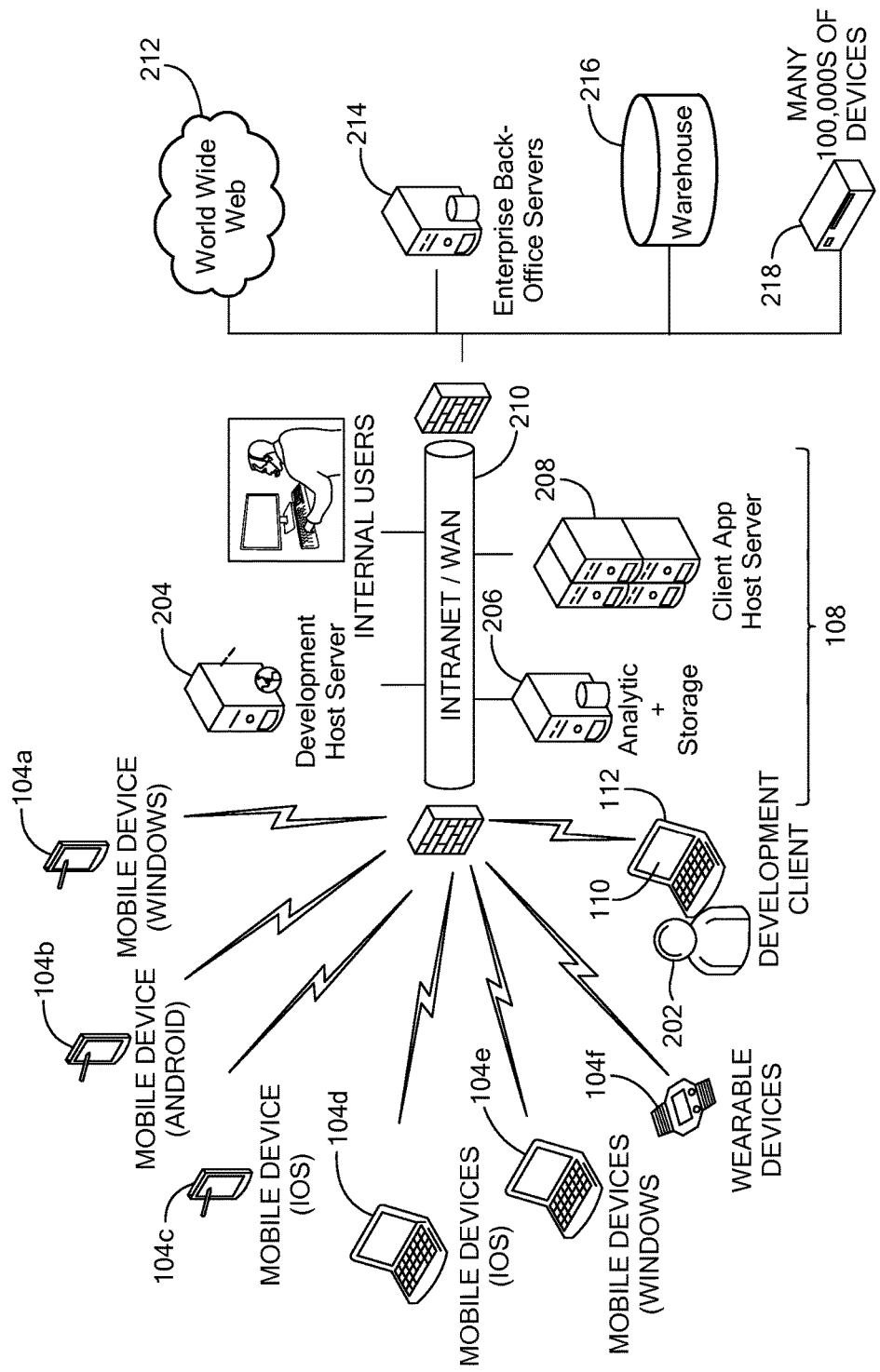
FIG. 2 is a block diagram of an example environment for developing applications (e.g., real-time Web applications) for executing on a set of computing devices in accordance with an embodiment of the invention.

FIG. 2 is a block diagram of an example environment 200 for developing applications for executing and/or deploying on a set of computing devices 104 in accordance with an embodiment of the invention. The applications may be mashup applications, Web applications, real-time applications, and the like. As shown in FIG. 2, the computing devices 104 include devices 104a to 104f that collectively form a heterogeneous environment. The devices 104a to 104f may also be referred to as test devices. For example, the devices 104a, 104b and 104c may be smart-phone mobile devices running different types of operating systems, such as Windows, Android, iOS, Windows Phone, Windows Mobile, Blackberry, Sailfish OS, Ubuntu Touch, and Tizen. The devices 104d and 104e may be laptop mobile-devices running different types of operating systems. The device 104f may be a wearable device having Web browsing capabilities.

An application developer 202 may centrally manage and test user interfaces and data interactions of the test devices 104a to 104f, to identify any unexpected behaviors caused by, for example, the operating system and native software (e.g., employing native APIs and protocols associated with a given platform) of the test devices 104a to 104f.

In some implementations, the Web server platform 108 provides the development workspace 110 to the developer's computing device 112. In some implementations, the Web server platform 108 presents the development workspace 110 via a Web browser application, embedded web browser, or the like, executing natively on the development client 112. Examples of Web browser applications include Internet Explorer, Safari, Mozilla, and Google Chrome. An example of an embedded web browser (also referred to as "panel", "Browser frame", and "Embedded Web browser Frame") includes Chromium Embedded Framework (CEF). The development workspace 110 may be a stand-alone software application that executes on the development client 112.

In some implementations, the Web server platform 108 provides various Web services to the client-side applications 102 and to the development workspace 110. For example, the Web server platform 108 may include or be associated with a development host server 204, a data analytic and storage server 206, a client-side application host-server 208, all of which may be connected within an intranet or wide area network (WAN) 210. The development host server 204 may provide Web hosting services for the development workspace 110. The development host server 204 may include services for compiling, building, translating, assembling, and/or evaluating files associated with the development of a client-side application, such as project files, program files, configuration files, and the like. In some embodiments, the development host server 204 includes one or more Apache-based servers. The client-side application host-server 208 may host Web services for the client-side applications 102. In some implementations, the client-side application host-server 208 includes one or more persistence servers that collect, combine, aggregate and/or make available real-time data for client-side applications. In some embodiments, the real-time data includes time series data, InfoTable, and the like. Examples of real-time data such as time series data and InfoTable are describes in U.S. patent application Ser. No. 14/222,100, titled "System and Method of Using Binary Dynamic REST Messages," and filed Mar. 21, 2014, the contents of which are incorporated herein by reference in their entirety.

The data analytics and storage server 206 may store and analyze data for the development host server 204 and/or the client-application host-server 208. In some implementations, the storage server 206 includes big data storage, such as Hadoop servers and data warehouses.

In some implementations, the Web server platform 108 connects to data content-providers, Web pages 212, business entities 214, data centers 216, and device clusters 218, for example, to retrieve data and information to be used by the client-side applications 102 and/or the server-side application 106. Such data-content providers (e.g., third party sources, self-curated sources) may include content-source services, such as map services, calendar services, data stream services, wiki page services, and portal services. The content-source services may be accessible, for example, using public Web service APIs, third-party Web service APIs, Web-widget libraries, Web-toolkit libraries, and screen scraping mechanisms of Web sites, local databases, Wiki pages, and the like.

In some implementations, the Web-server platform 108 may include servers and/or provide services relating to Internet of Things or machine-to-machine ("M2M") platforms that service data and information for a vast number of computing devices. Examples of such platforms are describe in U.S. patent application Ser. No. 14/222,123, titled "System and Method of Message Routing Using Name-Based Identifier in a Distributed Computing Environment," and filed Mar. 21, 2014, the contents of which are incorporated herein by reference in their entirety.

Figure 3A:
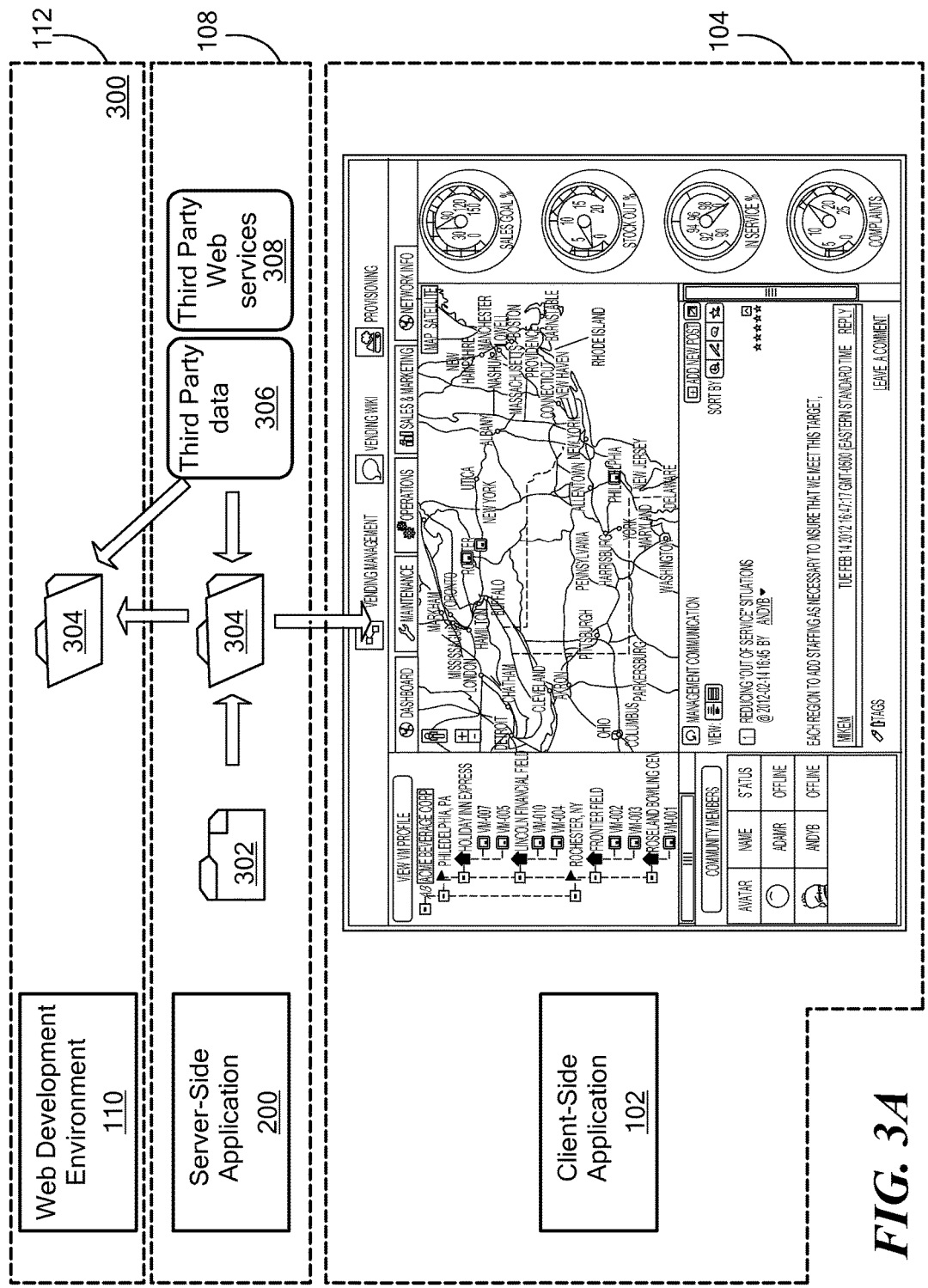
FIG. 3A illustrates an example method of building applications (e.g., real-time Web applications) having mashup elements in accordance with an embodiment of the invention.

FIG. 3A illustrates an example method of building applications including mashup elements in accordance with an embodiment of the invention. In some example implementations, embodiment, the applications are a real-time Web applications. An application developer 202 executes a browser session 300 on the developer's computing device 112, and accesses a Web portal hosted by the server-side application 200 that provides the development workspace 110. In some implementations, the development workspace 110 includes a graphical user interface (GUI) to view and navigate design and development libraries provided by the server side application 200. The design and development libraries can be used (e.g., by an application developer 202) to build applications, such as client-side application 102. One such type of design library is a mashup template library.

In some implementations, a logged in application developer 202 registers to develop a new mashup (e.g., Web mashup) application. In turn, a new Web mashup project corresponding to the new mashup application is created. The server-side application 200 also creates a new Web page definition file 302. The Web page definition file 302 may include presentation and data elements, which when executed by a client-side application 102 cause the display of mashup element and/or real-time data on the Web page. The Web page definition file 302 may be stored in both or either of the local memory of the development client 112 and the host memory of the Web server platform 108. The application developer may retrieve previously saved projects and Web page definition files 302 from the development workspace 110. In some implementations, the Web page definition file 302 includes Javascript files, CSS files, and configuration files.

In some implementations, a modified Web page definition file 304 is generated as third party content and Web services are incorporated, via the development workspace 110, into the project to build the client-side application. In some implementations, the server-side application 200 generates the modified Web page definition file 304 to run at the client-side application. The modified Web page definition may be previewed at the development workspace 110.

Figure 3B:
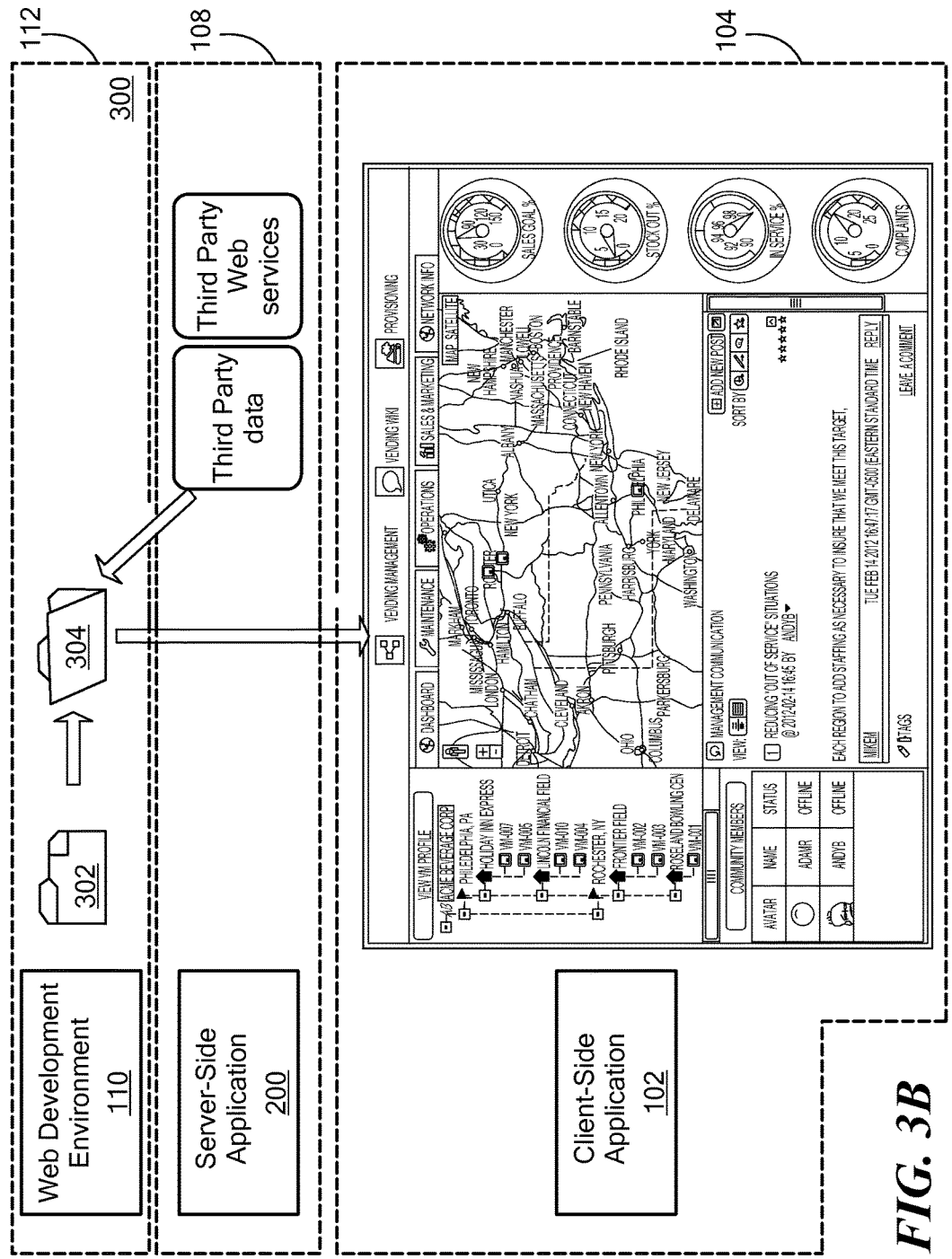
FIG. 3B illustrates an example method of building applications (e.g., real-time Web applications) including mashup elements in accordance with an alternative embodiment of the invention.

Alternatively, as shown in FIG. 3B, upon starting a new Web mashup project, the development workspace 110 creates the new Web page definition file 302 and stores it in local memory. The server-side application 200 may maintain a mirror (e.g., identical) copy of the Web page definition file 302 in the memory of the platform server 108, or the like.

In an embodiment of the invention, to improve or enhance an end user's experience in browsing data on the client-side application during runtime, the client-side application caches data and code objects to allow the client-side application to be used when connectivity to the content sources is not present (e.g., offline).

Figure 3C:
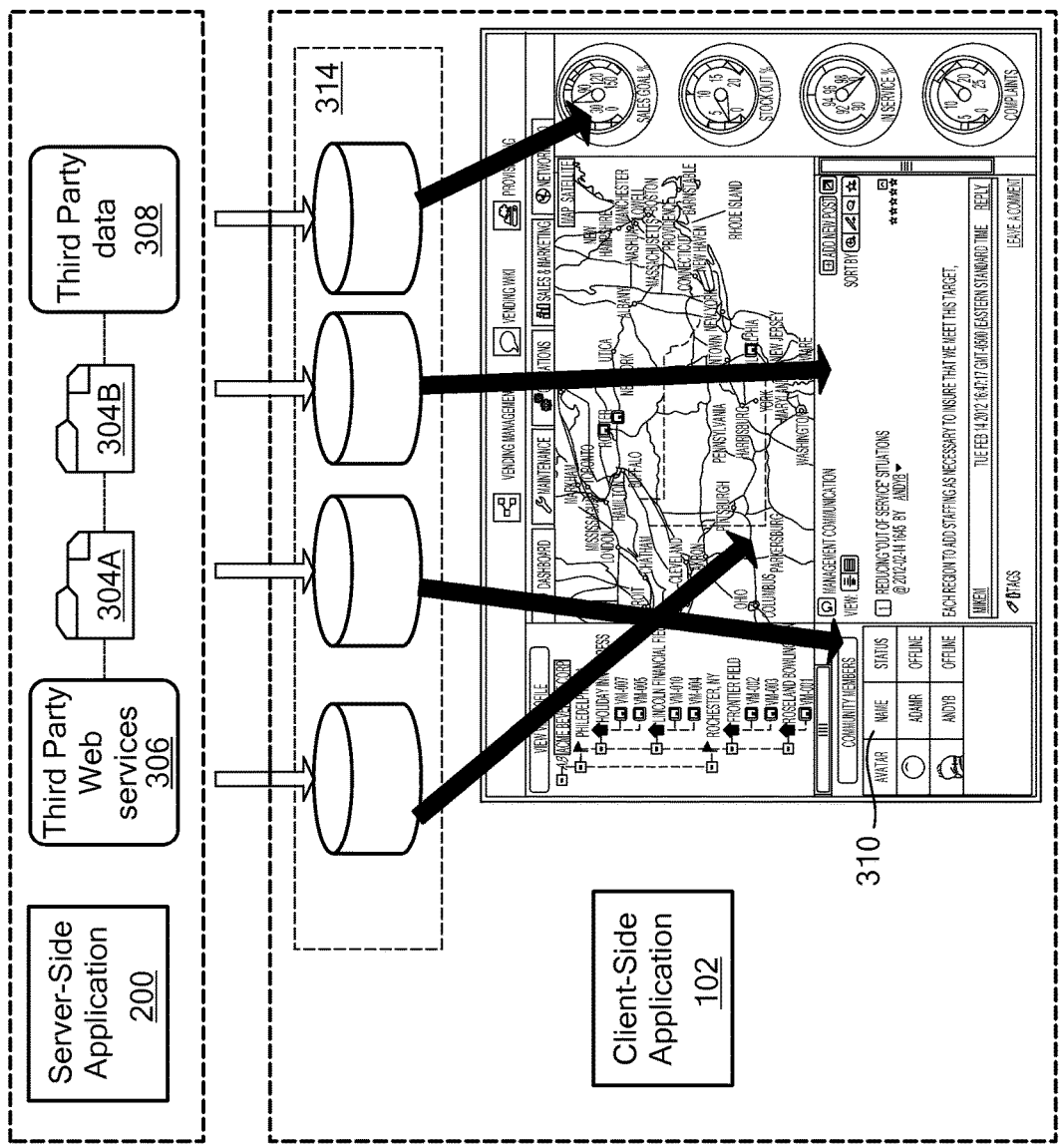
FIG. 3C illustrates an example method of caching mashup elements at applications (e.g., real-time Web applications) during runtime in accordance with an embodiment of the invention.

FIG. 3C illustrates an example method of caching mashup elements at applications during runtime, in accordance with an embodiment of the invention. In some example implementations, the applications may be Web applications and/or real-time data applications. The caching operation partitions real-time Web data at the client-side application and allows the real-time data to be accessed once the update transaction is completed. By virtue of this caching operation, the responsiveness of the application to request for real-time data may be improved. In addition, the caching operation may associate (e.g., package) instances of the real-time Web data with updates to client-side applications, thereby allowing for the real-time data and the updated application to be concurrently transmitted with an update and/or installation of the client-side application. The concurrent delivery of an instance of real-time Web data with the update and/or installation files allows developers to screen for unintended interactions of various executable or parse-able elements with the data.

The client-side application 102 caches the Web page definition files and the associated linked data content within the local memory or buffer 314.

In some embodiments, the Web page definition files and associated data content are cached within a browser-based application. The Web page definition files and the associated data content may be recorded in a manifest file. In some embodiments, upon the client-side application receiving the content, the client-side application determines if an application cache exists. If no application cache exists, the client-side application loads the received content and fetches all entries listed in the manifest file to create a first version of the application cache. Subsequent access to the client-side application causes the client-side application to (1) load the document and other assets specified in the manifest file using the application cache, and (2) provide a check event to the operating system event handler (of the computing device running the client-side application) to monitor for updates to the manifest file. If the cached copy of the manifest file is up-to-date, the client-side application may send a no-update event to the operating system event handler. On the other hand, if the manifest file has changed (e.g., it is not up-to-date), the files listed in the manifest file are fetched into a temporary cache. In turn, a progress event for each file or packet fetched into the temporary cache is sent to the operating system event handler. When the files from the manifest file have been successfully fetched, they may be moved to non-temporary cache and the cached event is sent to the operating system event handler.

To designate the appropriate content to cache, in some implementations, the development workspace uses the associative links made during the generation of the Web page definitions to generate a list of contents to include in a distribution of an application update. The list of contents may be recorded in an update manifest file. For example, during development of an application, the Web page definitions files 304A and 304B may be associatively linked to one another, to the third-party Web services 306, and/or to the third party data 308. The development workspace may add files 304A and 304B, the third party Web services 306, and the data content 308 to the manifest file. In some implementations, the update manifest file includes contents (e.g., extensions or web service objects) to be added to and/or edited in the Web page definition files, thereby resulting in an updated Web page definition files. In other implementations, the update manifest file includes a list of updated Web page definition files and/or machine instructions for the retrieval of the updated Web page definition files.

In some implementations, the development workspace adds each content source to the list of the manifest file. The manifest file may include, for example, JavaScript files, HTML files, CSS files, configuration files, and/or combinations thereof. The manifest file may include uniform resource identifiers (URIs) to public, private, or enterprise content sources, Time Series Data, and InfoTable (described in further detail below). In some implementations, the server side application 200 uses the manifest file to ensure that the updated Web page definition files 304 and the associatively linked data content are provided (e.g., concurrently), during runtime, to the client-side application 102. To this end, the server-side application 200 maintains a definition of such associative links. During runtime, the server-side application 200 may transmit the data contents 306 and 308, as well as the Web page definition files 304A and 304B, to the client-side application 102. An example of a manifest file for a widget extension is provided in Example 1.

EXAMPLE 1

```
<?xml version="1.0" encoding="UTF-8"?>
<Entities>
    <ExtensionPackages>
        <ExtensionPackagename="MapWidgets_ExtensionPackage"
            description="Map Widgets" vendor="Company Name"
            Version="1.0" />
    </ExtensionPackages>
    <StyleDefinitions>
        <StyleDefinition
            name="MapRegionStyle" description="Map region marker style"
            documentationContent="" lastModifiedDate="2013-10-03">
            <content>
                "displayString":"", "fontEmphasisUnderline":false, "fontEmphasisItalic":false,
                "textSize":"normal", "lineColor":"#000000", "backgroundColor":"#1206ff",
                "lineStyle":"solid", "lineThickness":1, "secondaryBackgroundColor":"",
                "fontEmphasisBold":false, "foregroundColor":"">
            </content>
        </StyleDefinition>
    </StyleDefinitions>
    <Widgets>
```

-continued

```
<Widget name="map">
   <UIResources>
      <FileResource type="CSS"file="map.ide.css"description=""
isDevelopment="true" isRuntime="false" />
      <FileResource type="JS" file="map.ide.js" description=""
isDevelopment="true" isRuntime="false" />
   </UIResources>
</Widget>
</Widgets>
</Entities>
```

In Example 1, a portion of a manifest XML file for a widget extension is provided. The manifest preferably automatically updates a Web page definitions files (e.g., one or more Mashup application files) when imported into the system. In this example, the update manifest file of Example 1 includes a web service object for a map extension. The extension is added to the runtime Web page definition file, for example, as shown in Example 2. In some implementations, the Web page definition file includes runtime instructions to the functions of the mashup application.

EXAMPLE 2

<script type="text/javascript" src="../Common/widgets/map.ide.js"></script>

Figure 4:
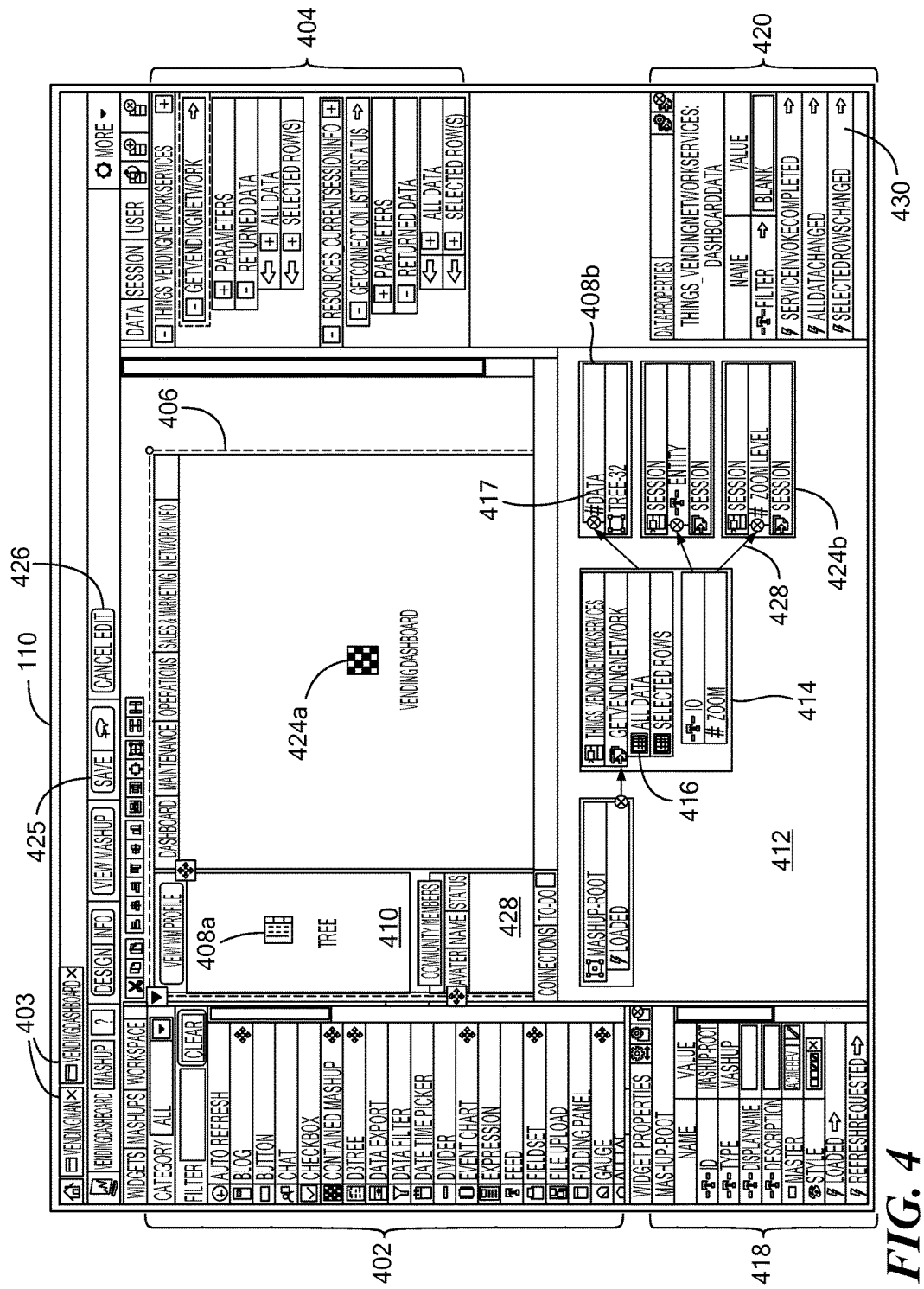
FIG. 4 illustrates an example development workspace for building applications (e.g., real-time Web applications) including mashup elements in accordance with an embodiment of the invention.

FIG. 4 illustrates an example development workspace 110 for building applications including mashup elements in accordance with an embodiment of the invention. In some example implementations, the applications may be Web applications and/or real-time applications. The development workspace 110 may be a Web application or a computing application executed in a desktop operating system. The development workspace 110 may build mashup elements by aggregating multiple Web services (including third party APIs) and data sources. The data content may be combined or manipulated (e.g., modified) to create new services within the development workspace 110.

Mashups may be imported, manipulated, and displayed using widgets that display a physical element using and/or employing data content or data content elements. To this end, the widgets may be defined by the physical elements, data content elements, and their associations.

Figure 6:
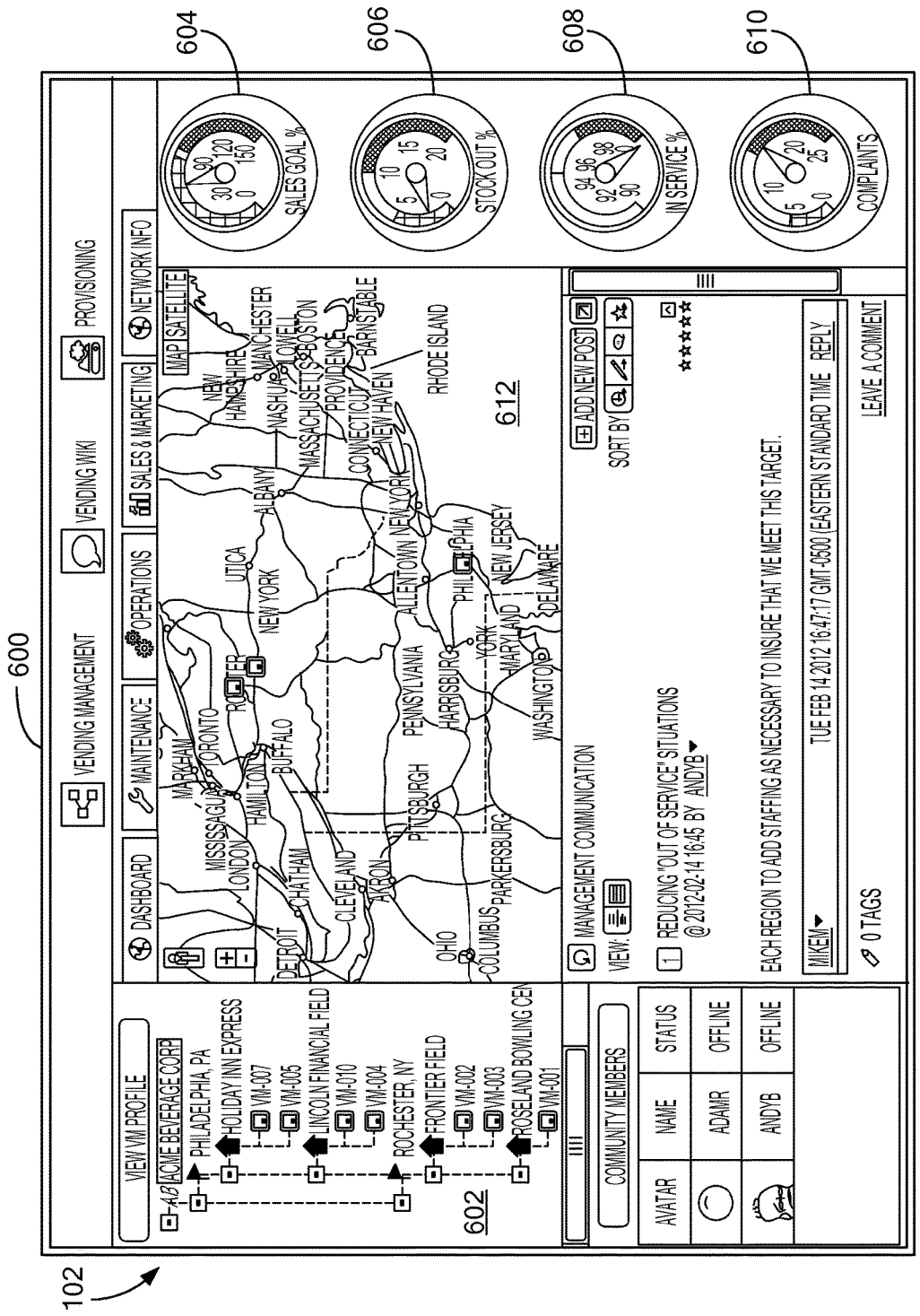
FIG. 6 illustrates an example application generated from definition files corresponding to the mashup definitions of FIGS. 4 and 5 in accordance with an embodiment of the invention.

In some implementations, the development workspace 110 includes a set of widget components 402 and a set of data components 404 that collectively serve as tools for building the client-side application 102 (e.g., FIG. 6, client side application 102). The widget components 402 may include functions represented in a graphical form that can be dragged into a first development workspace 406. The functions may be GUI widgets, such as buttons, check boxes, gauges (e.g., single needle, progress), charts (e.g., pie, range, time series, proportion). The functions may also be mashup widgets and programming operations (e.g., file upload function, a data export function, an expression function). The GUI widgets may serve as definitions of the presentation elements to be displayed at the client-side application 102 during runtime. The mashup widgets may include a blog, a "contained" mashup (e.g., a nested mashup within a mashup), a multi-dimensional tree, an event chart, a gauge, and the like. The widget components 402 include tools such as filter or search functions to allow searching of the list of available components.

Upon a given widget component 408 (e.g., tree table 408a) being "dragged and dropped" from the widget components 402 into the first development workspace 406, a first representation 408a of the widget appears in the first workspace 406, and a second representation 408b appears in a second development workspace 412. Drag and drop refers, in some instances, to the concept of selecting (e.g., by clicking- or tapping-and-holding) a virtual object (e.g., icon, box, text) on an interface (e.g., graphical user interface) and moving it (e.g., by releasing the selection) into another location on the interface.

In some implementations, the first representation 408a is included, shown and/or defined within a framed workspace 410. The size and location of the workspace 410 provides a spatial definition of the widget 408. Various presentation and appearance properties of the widget 408 may be modified at the widget-properties window 418. Properties of the widget-properties window 418 may include, for example, but not limited to, widget identifier, widget type, name identifier to identify the widget, user-defined description for the widget, coordinate location of the widget in the respective rendering workspace, size of the widget, and layer order for the widget with respect to other widgets or rendered elements in the rendering workspace. In some embodiments, the widget properties are pre-populated with defaults values, and any changes from the default values are highlighted in the widget properties window 418.

In some implementations, the second representation 408b provides a data content definition of the widget 408. Various data properties and services of the widget 408 may be modified or set at the data properties window 420. In some implementations, a data service includes a client-side event to request additional data service or navigation links and is modifiable via a property setting (shown, for example, as "selected rows changed" 430).

Data component 414 may also be "dragged and dropped" from the data components 404 into the second development workspace 412. The data component 414 serves as a source of the data content that is accessible to the server-side application 200 that a given developer has permission to access. The data component 414 shows available data 416 associated with a given data source. The data component 414 includes definitions of the data content elements (e.g., data services) to be employed at the client-side application 102 during runtime. To this end, the second development workspace 412 allows the application developer 202 to link (or associate the property definitions of a widget (including mashup) with the definitions for the data content elements of the widget.

The data components 404 and 414 are defined once in the development workspace for a given client-side application and can be used several times. The services defined by the data content 414 and data components 404 provides, during runtime, instances of data to the GUI widgets. The data components 404 and 414 own the data set, not the visualization widgets.

In some embodiments, the data components 404 and 414 provide selectable options to manage events (e.g., to invoke an event after a service call is done; to invoke an event when the data service returns a data set, and the data set has been updated; and to invoke an event when a different portion of the available data set is selected).

In some implementations, the link is preferably a rope object (e.g., a line or wire) connecting the data component 414 with the widget component (e.g., widget 408). This link may be based on an association of two or more widgets. The link may be based on the data exchanged. The link may be based on the direction of the message or event. The link may be based on a property, such as a user name, a social networking aspect, or a frequency associated with the update.

As shown, a given element 416 ("ALL DATA") of the data component 414 ("THINGS VENDING NETWORK SERVICES") is linked to elements 417 ("DATA" of "TREE-32") of the widget object 408b. The element 416 includes an icon and/or text to provide an indicia of the type of data available with (e.g., corresponding to) the element. Similarly, the widget-object element includes icons and/or text to provide an indicia of the type of data that the widget can consume (e.g., collect, use). In some implementations, the development workspace 110 restricts the connections between mismatched data types. In some implementations, the development workspace 110 may highlight allowable connections when a data component element or a widget object is selected in the second development workspace.

In some implementations, the linkages and associations made in the workspace 110 are used to designate contents for the a manifest file that may be used to cache the updates of modified mashup applications or to cache the code and contents for run-time operations at the client-side application, as described above with reference to FIG. 3C.

The development workspace 110 includes a save command 425. The save command 425 causes the content of the first development workspace 406 and the second development workspace 412 to be saved. The content may be stored and/or saved locally at the development workspace 110 and/or at the server-side application 200.

In some implementations, the save command 425 initiates a wrapper creation process to convert the physical elements and the data content elements defined within the workspace 406 and 412 to a Web page definition file. The Web page definition file may be expressed and/or executed in one or more browser or server supported programming languages and/or code. An example of such programming languages may include JavaScript, HTML, CSS, and/or combinations thereof. The Web page definition file may be expressed in various dynamic language, such as, but not limited to, Perl, VBScript, Dart, PHP, ASP, .NET, ColdFusion, Ruby, Python, and TKL. In some implementations, adding a widgets component 402 and/or a data component 404 into the workspaces 406 and/or 412 initiates the wrapper creation process.

In some implementations, the development workspace 110 includes a "cancel edit" command 426. The command 426 causes the undoing (e.g., reverting) of all the modifications made to the workspace 406 since the previous save process. Alternatively the command 426 may cause the previously saved workspace 406 to be loaded, such as from local memory or from the server-side application 200.

Other widget components 402 shown in FIG. 4 include a mashup for status of "community members" 428. The status may provide a real-time list of members use the client-side application 102 during run time. In some implementations, the workspace 406 may include navigable tabs 422 to allow navigation between different workspace views of the client-side application 102. Navigation between views may serve as states within the definitions of the presentation elements to be displayed at the client-side application 102.

A nested or contained mashup element may be made of other mashup elements. The development workspace 406 provides a "contained mashup" widget 424. The widget 424 includes a widget representation 424a in the workspace 406 and a data representation 424b in the second development workspace 412. A nested or contained mashup indicator is a part of a mashup definition.

Figure 5:
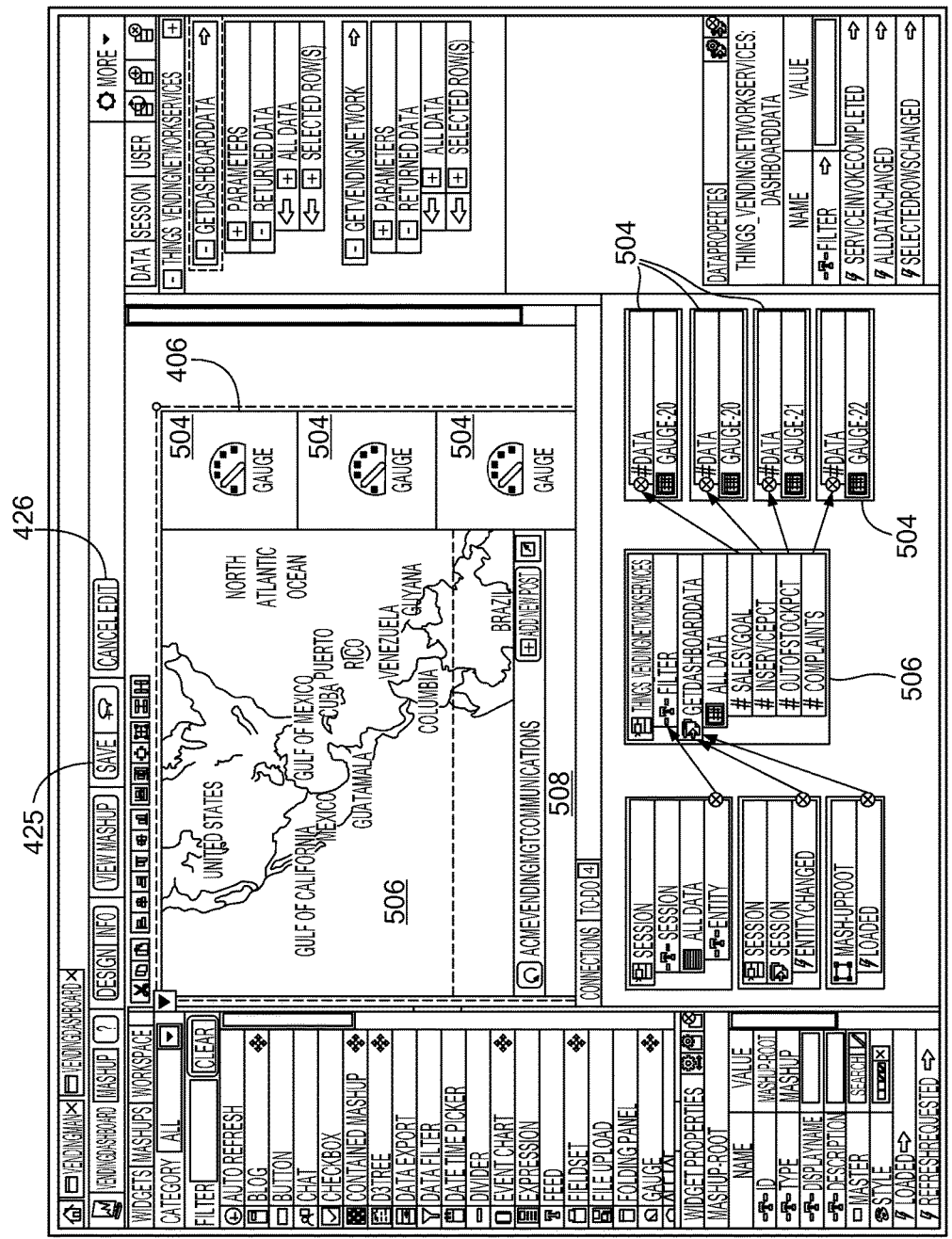
FIG. 5 illustrates an example development workspace for building mashup definitions in accordance with an embodiment of the invention.

FIG. 5 illustrates an example development workspace 110 for building mashup definitions in accordance with an embodiment of the invention. The development workspace 110 includes a navigational tab 403 to select among the various workspace definitions. As shown and described in FIG. 4, workspace 406 includes a nested mashup 424a. In some implementations, a nested mashup may be built or designed in a similar manner to building a non-nested mashup.

Other widget components 402 shown in FIG. 5 include a mashup for communication logs 508, a map service 506, and mashup for gauge elements 504. The communication logs may provide a display of real-time communications between end users during runtime. The gauge elements 504 may display data collected and/or received from a web data or web services. The map service may provide a display of real-time map data such as that provided by Google Maps.

In an aspect of an embodiment of the invention, to reduce the testing time of a prototype client-side application, the save process is used as a trigger for both development actions and test actions. The save process may be executed at the development workspace 110 and/or the server-side application. The development workspace 110, in some implementations, maintains a development designation, testing designation, and the like, as well as a runtime designation, published designation, and the like, for a set of Web page definition files (e.g., associated with a project). The development designation allows developers to invoke and/or run certain instructions in the webpage definition files and/or other application files to provide granular control of testing of the application. The runtime designation indicates that the instructions is part of the published application.

The designations, in some implementations, are editable via a widget rendered on the graphical user interface and/or a project workspace screen for selecting properties of a given project. The designation may be embedded in headers, files, tags, web service definitions associated with the Web page definition files for a given project. An example of a development and runtime designation is shown in Example 1. In the example, a "isDevelopment" flag and a "isRuntime" flag is associated with a web service object. In some implementations, the save process is linked to a development designation. To this end, a testing designation is caused to be received by a client-side application with updates (e.g., to the webpage definition files) when a save command is invoked and the development workspace is a development mode. The client-side application employs the designation to invoke instructions specific to the designation (for example, running and/or executing certain instructions having a development designation and not running and/or executing other instructions lacking the designation).

Turning back to FIG. 3A, upon the application developer 202 saving an instance of the development workspace 110, a modified Web page definition file 304 is created.

The save process may initiate the wrapper process to generate the modified Web page definition files 304, as described in relation to FIG. 4.

In some implementations, the save process may be triggered by the selection and/or activation of a save command 425 in the development workspace 110. Additionally, the modified Web page definition file may be generated when the link relationship between the data and widget component is changed. Additionally, the modified Web page definition file may be generated when the properties of the data components or the widget components are changed within the properties windows 418 and/or 420. Additionally, the modified Web page definition file may be generated when annotations are added to the workspace. Additionally, the modified Web page definition file may be generated when navigable tabs 422 are changed. Additionally, the modified Web page definition file may be generated when nested mashups are created, modified, replaced, or deleted.

In some implementations, the modified Web page definition file is also generated based on changes to presentation elements or to logical connection with and/or between data elements, as described in relation to FIGS. 4 and 5. For example, the modified Web page definition file may be generated when a new widget is added, replaced, modified, or removed. Similarly, the modified Web page definition file may be generated when a workspace is added, removed, or changed in relation to size and/or location.

In some implementations, the modified Web page definition file 304 replaces the new or previously saved or retrieved Web page definition file.

In some implementations, the save process causes the server-side application 200 to transfer the modified Web page definition files 304 to the development workspace 110. To this end, a save command causes the definitions files 304 to be tested on both the development workspace 110 and the client-side application 102. In such implementations, the development workspace 110 opens a test window to display a preview of the mashup. The server-side application 200 may provide data content 306 and/or Web services 308 used for the display.

FIG. 6 illustrates an example application 600 generated from the Web page definition files corresponding to the mashup definition of FIGS. 4 and 5 in accordance with an embodiment of the invention.

As shown, the client-side application 600 is a mashup Web application for managing the operations of a set of deployed vending machines (shown as "VM-001," "VM-002," "VM-003," "VM-004," "VM-005," and "VM-007").

To this end, the mashup Web application provides a dashboard for viewing data associated with the vending machines. As shown in FIG. 6, the data may include sales goal volume information ("SALES GOAL 604"), frequency of stock being out information ("STOCK OUT 606"), frequency of machine being in service information ("IN SERVICE 608"), and number of complaints received information ("COMPLAINTS 610"). Although some of the data 604, 606, 608, and 610 is displayed, via corresponding gauges, as percentages, it should be understood that data can be displayed as totals, fractions, degrees, and the like.

The mashup Web application also displays map service information 612, displaying the respective location of the vending machines VM-001 to VM-007. As shown in FIG. 6, the deployed vending machines may be organized, in a tree diagram 602, by: sites (e.g., "Holiday Inn Express", "Lincoln Financial Field", "Frontier Field", and "Roseland Bowling Center"); (2) regions (e.g., "Philadelphia, Pa." and "Rochester, N.Y."); and (3) by companies (e.g., "Acme Beverage Corp"). To this end, the mashup Web application may have a number of display states, to display information (e.g., vending machine information) in a selected manner and/or order. For example, in FIG. 6, the locations of the vending machines are organized in a tree diagram 602 having nested elements in a multi-level table.

When a vending machine or a location is selected in the tree diagram 602, the client-side application 600 is configured to display the appropriate data information. In some implementations, the tree diagram 602 is a widget component, such as the "tree" table 408 described with reference to FIG. 4. In some implementations, gauges (e.g., 604, 606, 608, and 610) correspond to the gauge elements 506 described with reference to FIG. 5.

In another aspect of the embodiment of the invention, the saving process described with reference to FIG. 3A may trigger a function that updates a prototype client-side application without requiring the application developer to physically touch or possess any of the test devices to initiate the update. In some implementations, upon receipt of a trigger message from the Web server platform 108, each of the test devices 104a to 104f is triggered to receive the modified Web page definition files 304.

In some implementations, given test devices 104a to 104f receive updates (e.g., update files) by conventional push, pull, and update operations and/or mechanisms. For example, in some implementations, test devices 104a to 104f are updated via push operations, in which the Web server platform 108 pushes and/or transmits update Web page definition files 304 to the devices 104a to 104f. Alternatively, in some implementations, test devices 104a to 104f are updated via pull operations, in which the devices 104a to 104f pull and/or request updates from a Web server platform 108 and, in turn, the Web server platform 108 transmits the update Web page definition files 304.

In some implementations, the client-side application updates its (current) Web page definition files using and/or with the set of received modified (e.g., updated) Web page definition files, without input by the user at the client-side application. In some implementations, to update the Web page definition files, the client-side application replaces the current Web page definition files stored and/or running at the client-side application 102 with the modified Web page definition files. Alternatively, to update the current Web page definition files, the client-side application 102 executes the updated Web page definition files and, in turn, delete the current Web page definition files. Alternatively, to update the current Web page definition files, the client-side application employs various conventional operations such as read, write, or modify commands.

In another aspect of the embodiment of the invention, to reduce the testing time of a client-side application including mashup elements, the development platform provides a function to allow for updated client-side applications to retain their last view displayed (or being displayed) on a test device before the update occurs. In some implementations, the retention data is associated to both a navigable screen as well as various presentation states of each of the mashup elements that may be displayed in that particular screen, as described in relation to FIG. 4. The feature may be invoked, in some implementations, if the service is designated with a development or testing status, as for example, discussed in relation to Example 1.

To retain the last view, in some implementations, the client side application uses data content to store viewable state information of the mashup. In some implementations, the data content is structured as a hierarchical data table. To this end, a presentation state may be associated to elements located within the hierarchical data table. In some implementations, this presentation state is a path that defines relationships between node elements composing the hierarchical data table.

An example of retaining the last view being displayed prior to updating the Web page definition file is now discussed. As described in FIG. 6, the client-side application includes a tree diagram 600 to display the vending machines organized by sites, regions, and companies. To this end, vending machines may be selected in order to display and view information related to the selected machine. Alternatively, a site (e.g., stadium), region (e.g., city) and/or company may be selected to aggregate and display information of the machines associated with that site, region and/or company, respectively. Each of the selections of a site, region and/or company, in essence, presents a different state of the mashup display for the client-side application.

Figure 7:
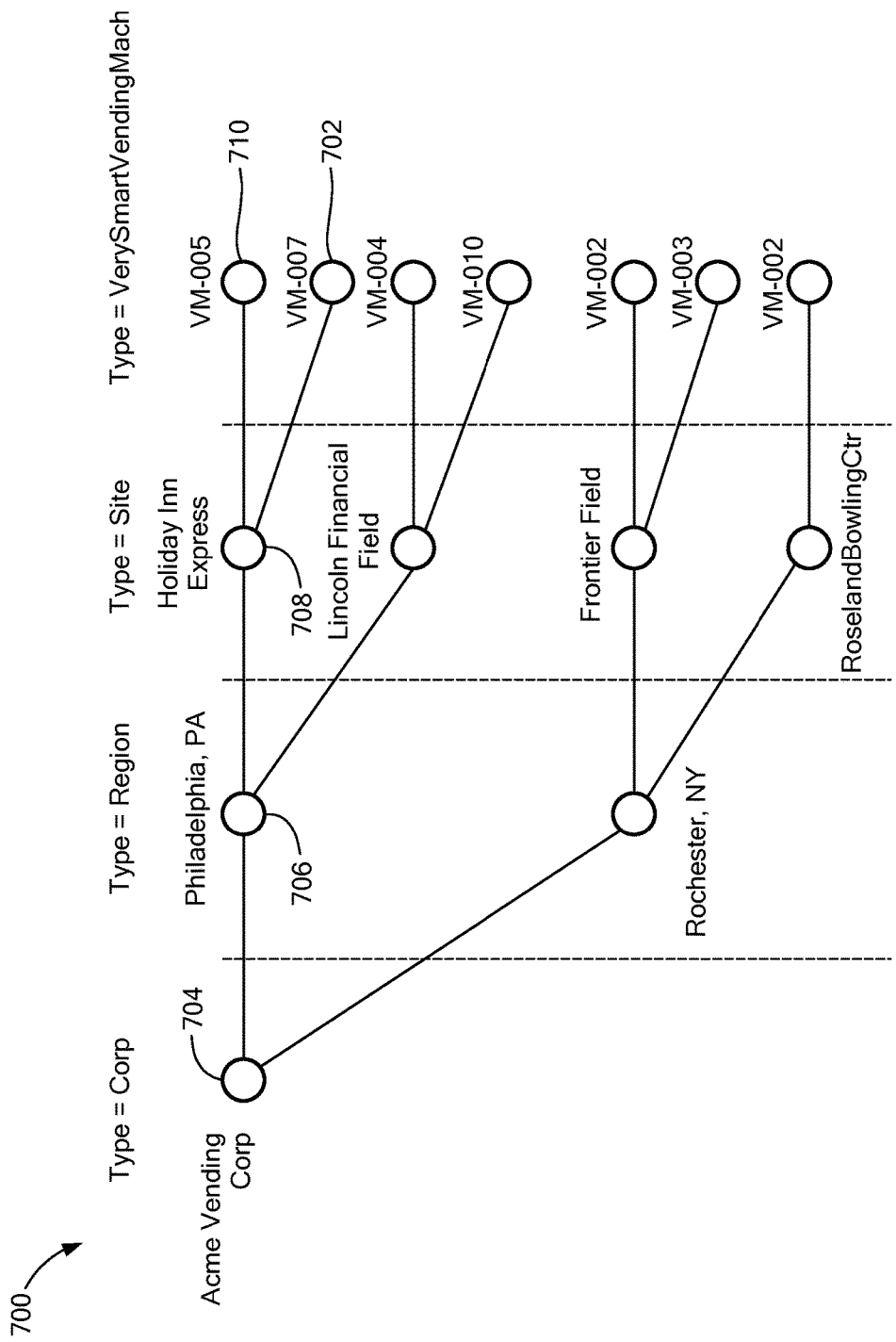
FIG. 7 illustrates example multi-level hierarchical data for use during runtime of applications in accordance with an embodiment of the invention.

FIG. 7 illustrates an example method of updating the client-side application in accordance with an embodiment of the invention. Specifically, the figure illustrates an example multi-level hierarchical data table 700 corresponding to the example tree diagram 602 shown in FIG. 6. As shown in FIG. 7, nodes are organized based on their type (e.g., node type). To this end, the client-side application maintains a cursor to a given node during run time. In some implementations, the cursor is defined as a path within the diagram. This path may be defined by nodes along the path and relationships between the nodes.

For example, the last review being shown being of a vending machine "VM-007" node 702. The cursor is, thus, located at "VM-007" node 702. "VM-007" node 702 has a path defined by a set of data nodes, including node 702, 704, 706, and 708 (i.e., "VM-007" node 702, "Acme Vending Corp" node 704, "Philadelphia, Pa." node 706, and "Holiday Inn Express" node 708). The path is also defined by the relationships among the nodes. In some implementations, the relationship includes the "Acme Vending Corp" node 704 being linked to the "Philadelphia, Pa." node 706, the "Philadelphia, Pa." node 706 being linked to the "Holiday Inn Express" node 708, and the "Holiday Inn Express" node 708 being linked to the "VM-007" node 702.

To this end, in some implementations, when updating a Web page definition file, the client-side application 102 stores a path describing the data-node relationship that is associated with a selected cursor. In turn, the client-side application 102 traverses the data table 700 to the same selected cursor using the stored path. In instances in which the data structure or the presentation element is no longer present, the client-side application 102 may display a default state (e.g., root of the data table) or the furthest state along the path before a break in the node occurs.

In another aspect of an embodiment of the invention, the real-time Web application is configured to receive data organized in a structure mirroring its hierarchical data table 700. As described in relation to FIGS. 6 and 7, a tree diagram, for example, may be structured as a multi-level hierarchy. To this end, each of the nodes within the tree diagram may form a nested level that collectively defines a multi-level hierarchy. In some implementations, a server providing data service to the client-side application can provide the data organized with the same node structure as this multi-level hierarchy.

In some implementations, the server provides data records in a self-describing message. A self-describing message refers to a message having both data and metadata that provides a description of the data. In some implementations, the metadata is described in a structure known to both the server-side application that generates the message and the client-side application that consumes the message. In some implementations, the structure is defined as part of a Representational state transfer (REST) style data-model.

Figure 8:
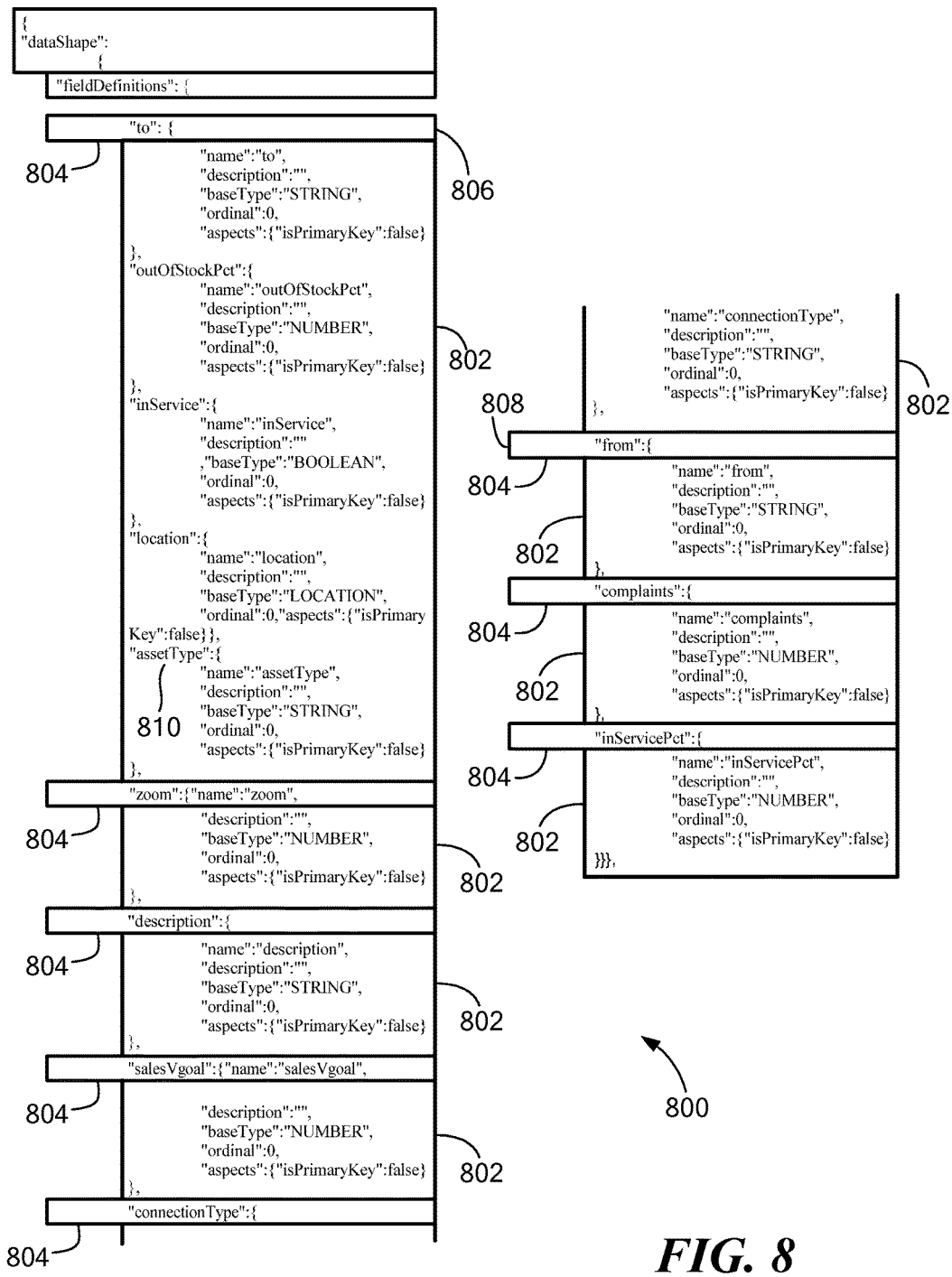
FIG. 8 illustrates an example data-model object for generating the example multi-level hierarchical data of FIG. 7 in accordance with an embodiment of the invention.

FIG. 8 illustrates an example data table 800 used in the operation of the real-time Web application in accordance with an embodiment of the invention. Specifically, the figure illustrates an example data-model object used to generate the example multi-level hierarchical data of FIG. 7. One such data-model object is an "InfoTable." The InfoTable is generally a self-describing data table having data, and metadata to describe properties of the data. For example, the metadata may include definitions 802 of various data fields 804, such as name, description, types, ordinal, and aspects.

The metadata may include definitions of objects that may be used to generate multi-level hierarchy data sets. In some implementations, the metadata includes a "to" field definition 806 and a "from" field definition 808. Moreover, the metadata may include an "asset Type" field definition 810 to serve as an attribute associated with a level. To this end, a data object may be structured as a linked list to form a hierarchical relationship where nodes within each level of the hierarchy share common "asset Type" field definitions 810.

Further examples and description of InfoTable are described in U.S. patent application Ser. No. 14/222,067, titled "System and Method of Abstracting Communication Protocol Using Self-Describing Messages," and filed Mar. 21, 2014, the contents of which are incorporated herein by reference in their entirety.

Figure 9:
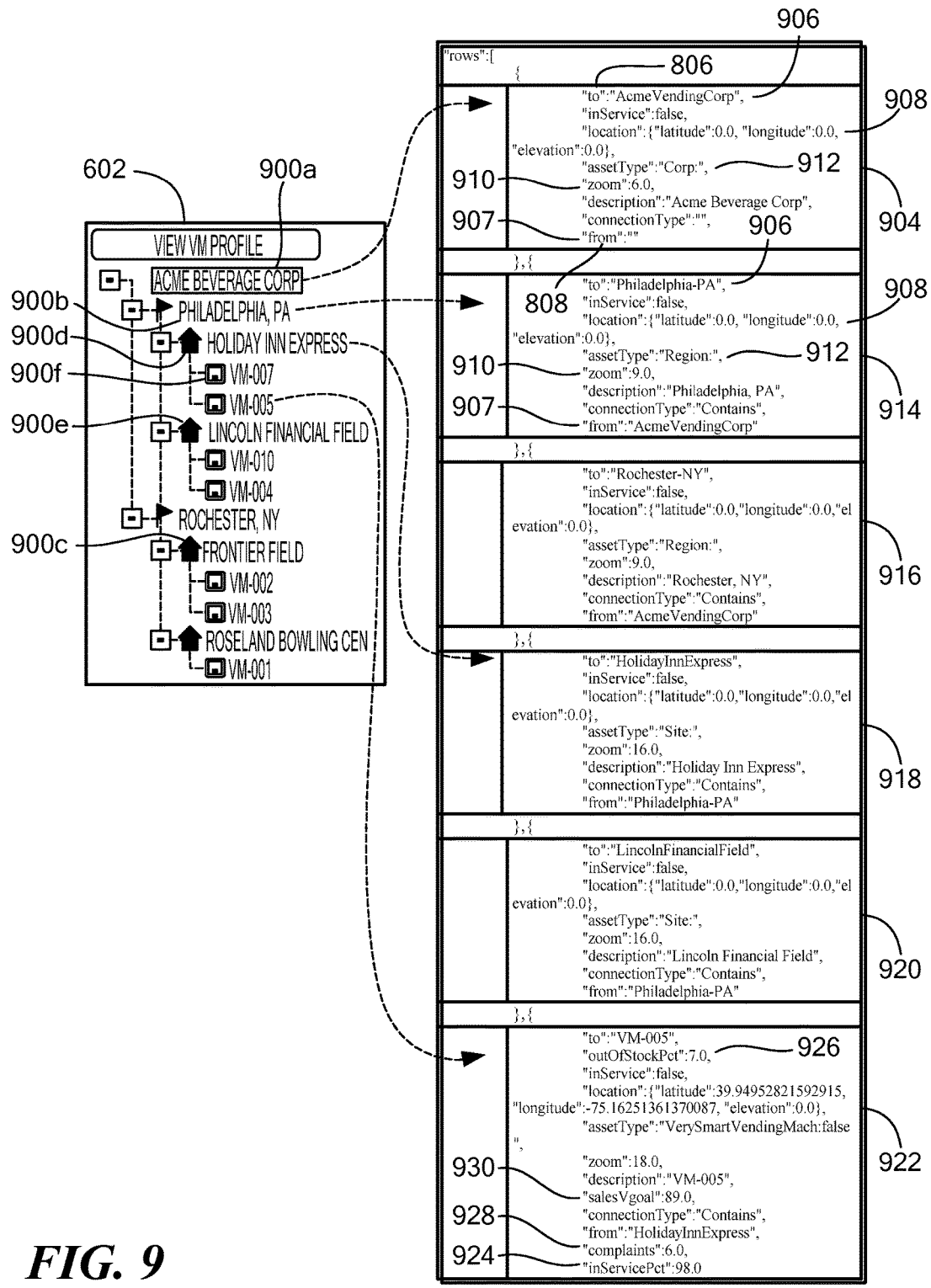
FIG. 9 illustrates an example method of using multi-level hierarchical data with mashup widgets in accordance with an embodiment of the invention.

FIG. 9 illustrates an example method of using multi-level hierarchical data with mashup widgets in accordance with an embodiment of the invention.

In FIG. 9, the tree diagram 602 of FIG. 6 is shown mapped to data records organized in a multi-level hierarchy. The data records includes data objects (e.g., 904, 914, 916, 918, 920, and 922) that are organized in the same hierarchical structure 700 as the tree diagram 602.

Specifically, the data records include several field values (e.g., 906, 908, 910, 912) which are related to the structural information associated to nodes, as well as the attribute and the specific record of the data. As shown, the structural information of each of the field values may be used to organize the elements as a linked list. This structural information includes a "to" field 906, a "from" field 908, and an "assetType" field 912.

As shown in FIG. 9, the data object 904 ("Acme Vending Corp") is a "Corp" asset type 912, associated with "Acme Vending Corp." To this end, the data object 904 serves as the first node in the list. The data object 914 ("Philadelphia-PA") is a "Region" asset type 912, connected from "Acme Vending Corp" to "Philadelphia-PA." Data object 918 ("Holiday Inn Express") is a "Site" asset type 912, connected from "Philadelphia-PA" to "Holiday Inn Express." The data object 922 ("VM-005") is a "VerySmartVendingMach" asset-type 912, connected from "Holiday Inn Express" to "VM-005." These relationships (e.g., connections) mirror the path illustrated in FIG. 7, in which the node 704 connects to the node 706, the node 706 connects to the node 708, and the node 708 connects to the node 710.

As shown in FIG. 9, the data records are represented in JavaScript Object Notation (JSON) format. It should be understood that this is merely for exemplary purposes and that other types of representations of the data may be employed.

As shown in FIG. 9, the data records include data associated with each of the vending machines. This data may include values relating to "sales volume goal" 920, "number of complaints" 922, "in-server percentage" 924, and "out-of-stock percent" 926. The data may be displayed by gauge widgets (e.g., 604, 606, 608, and 610), as described in more detail with reference to FIG. 6. To this end, a cursor selection to another vending machine in the tree diagram 602 does not necessitate the client-side application to retrieve additional data from a server.

Moreover, a single record set of the content data allows the client-side application to change its state to any of the mashup views during its runtime.

In some implementations, the record set is cached, as described in more detail with reference to FIG. 3C. Caching the record set allows the operation of the client-side application, including the mashup elements, even when the communication to the server-side application is not present (e.g., offline).

Figure 10:
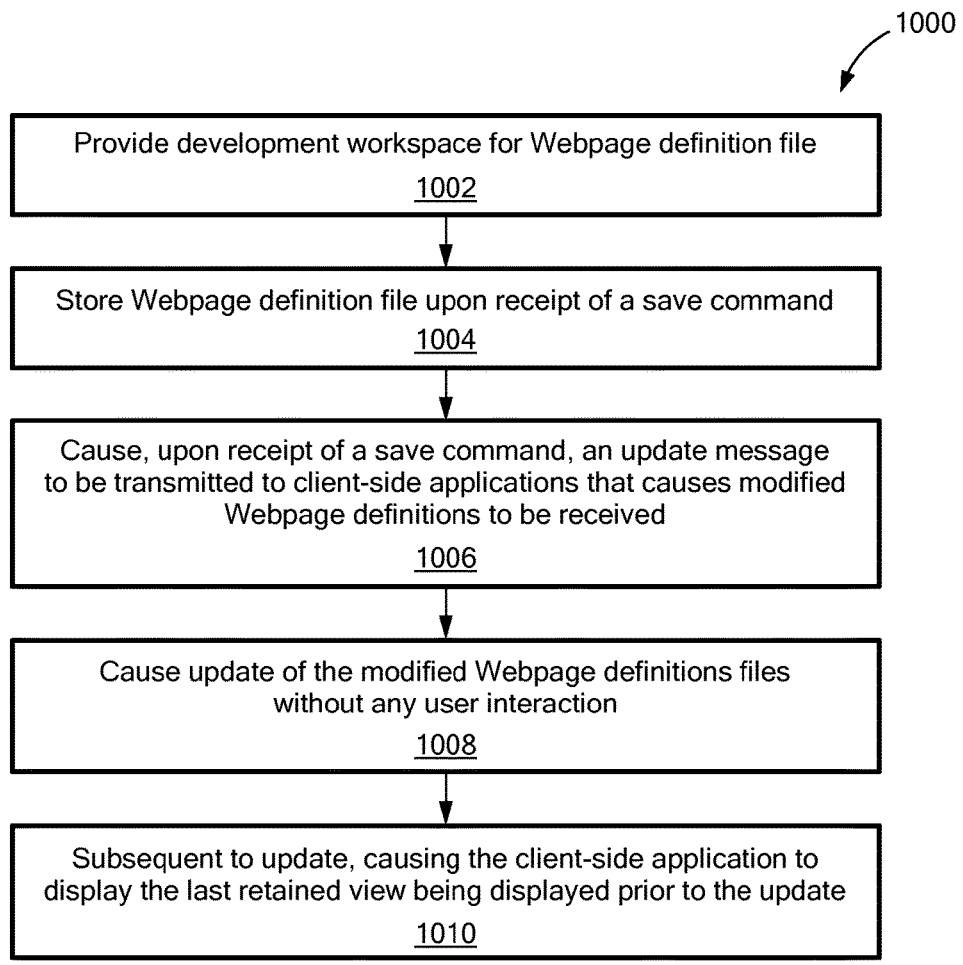
FIG. 10 is a flow chart of an example method of developing applications for multiple platforms in a heterogeneous environment in accordance with an embodiment of the invention.

FIG. 10 is a flow chart of an example method 1000 of developing applications for multiple platforms in a heterogeneous environment in accordance with an embodiment of the invention. The method begins by providing, by a first computer, a development workspace (step 1002), as shown and described in relation to FIGS. 4 and 5. The development workspace is used, for example, to build a set of Web page definition files for running on one or more client-side applications. The development workspace combines a number of composite Web service objects (e.g., mashups) for the set of Web page definition files. Composite Web service objects may include widgets elements and mashup elements. The composite Web service objects may include content source services selected from a group consisting of a map service, a calendar service, a data stream service, a wiki page service, a portal service, and the like. A content source may be a public Web service API, a third-party Web service API, a Web-widget library, a Web-toolkit library, a screen scraping of a Web-site, a local database, and a Wiki page. The client-side application is configured to run on a set of connected platforms in a heterogeneous environment, for example, as described in more detail with reference to FIG. 2.

The method 1000 includes storing a set of modified Web page definition files, in response to a save command being received via an input at the development workspace (step 1004), for example, as described in more detail with reference to FIGS. 3A and 3B. The set of modified Web page definition files includes at least one modification of at least one of the composite Web service objects from a set of current Web page definition files associated with a previous save command.

The method 1000, in turn, may include causing, by a processor responding to the save command, a message to be transmitted to each of the client-side applications on the connected platforms (step 1006), for example, as described in more detail with reference to FIG. 3A. The message may cause each of the client-side applications to receive the set of modified Web page definition files without any input by a user at the client-side application.

The method 1000, in turn, may include causing the client-side application to update the set of current Web page definition files with the set of modified Web page definition files (step 1008), for example, as described in more detail with reference to FIGS. 3A and 3B. The updating occurs without any input by the user at the client-side application.

In turn, the client-side application displays the last retained view being displayed prior to the update (step 1010), for example, as described in more detail with reference to FIGS. 3A and 7.

Figure 11:
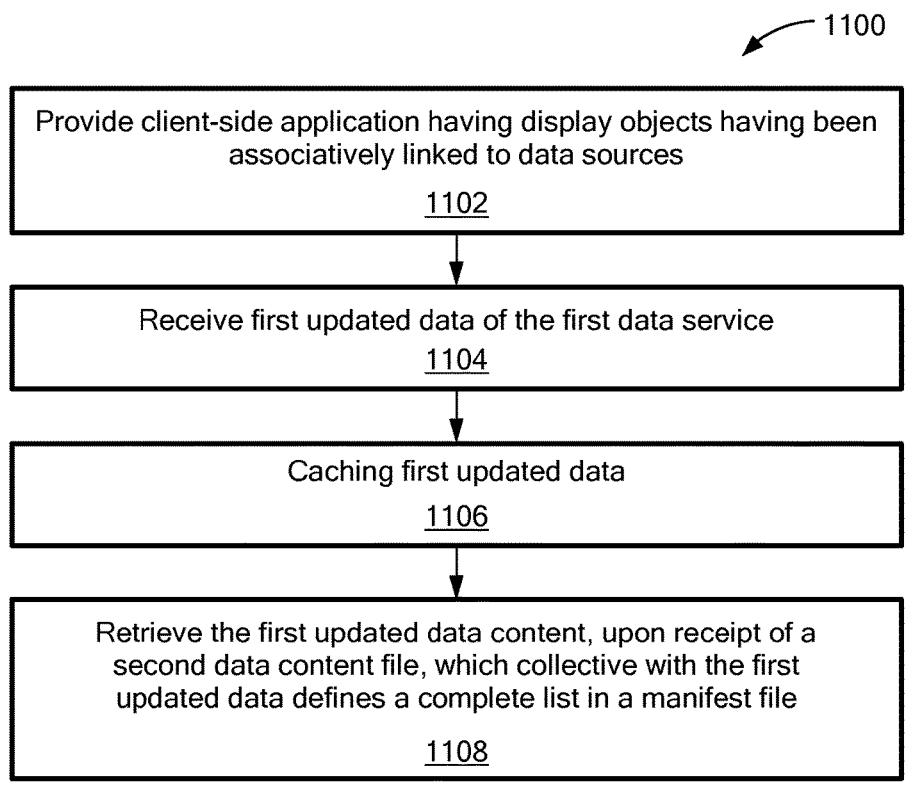
FIG. 11 is a flow chart of an example method of caching mashup objects during runtime of applications in accordance with an embodiment of the invention.

FIG. 11 is a flow chart of an example method 1100 of building associative links between mashup objects in a development workspace, the associative links being used to cache the mashup objects during runtime of applications in accordance with an embodiment of the invention.

The method 1100 includes providing a client-side application running on a connected device (step 1102), for example, as described in more detail with reference to FIGS. 4 and 5. The client-side application includes a number of Web page definition files having one or more composite Web service objects, including a first composite Web service object and a second composite Web service object. The first composite Web service object is associatively linked to a first data service from a first data source, and the second composite Web service object is associative linked to a second data service from a second data source.

The method 1100 includes receiving, during runtime of the client-side application, a first updated data content of the first data service from the first data source (step 1104), for example, as described in more detail with reference to FIG. 3C. The first updated data content may be listed in a manifest file. Examples of the first updated data content includes, for example, but not limited to, Javascript object, an HTML object, an image, a Web-mashup definition, and a Web-mashup artifact.

The method 1100 includes caching the first updated data content in memory (step 1106) if files in the manifest file are not present, as described in more detail with reference to FIG. 3C.

The method 1100 includes retrieving the first updated data content from memory and updating the composite Web service objects of the Web page definition files with the first and second update data contents (step 1108). Updates of the composite Web service objects may be performed in a transactional manner.

Figure 12:
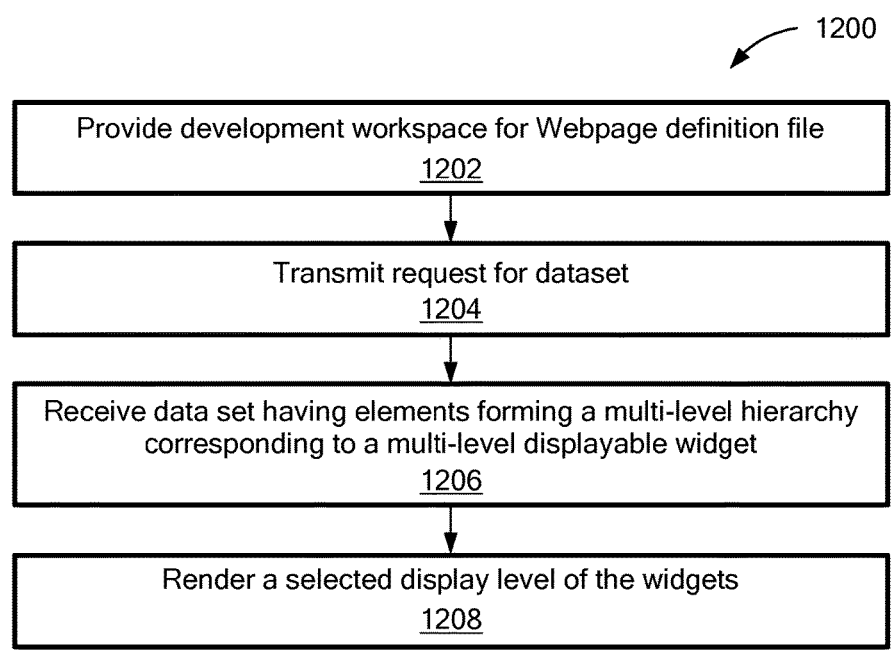
FIG. 12 is a flow chart of an example method of rendering mashup elements using multi-level hierarchical data in accordance with an embodiment of the invention.

FIG. 12 is a flow chart of an example method 1200 of using multi-level hierarchical data during runtime in accordance with an embodiment of the invention.

The method 1200 includes providing, at a client-side application running on a computing device, a graphical user interface having one or more rendering widgets and an input widget having one or more levels (step 1202) where each of the one or more rendering widgets had been associated to one or more data content source. The rendering widgets may be associatively linked to one or more data content sources at a development workspace, and may be used to define the rendering widgets, for example, as described in more detail with reference to FIGS. 4 and 5.

In some implementations, the graphical user interface includes a map widget, in which received data includes data for each of the levels of the input widget.

The method 1200 includes transmitting, at the client-side application, a request for a data set corresponding to and/or from the data content source (step 1204). The transmission may be in response to an alert received at the client-side application.

The method 1200 includes receiving, at the client-side application, the data set which forms a multi-level hierarchy corresponding to one or more levels of the input widget (step 1206), for example, as described in more detail with reference to FIGS. 7-9. The data set may include one or more data content sources associated with the rendering widgets. The input widget may be presented as a tree diagram.

In some implementations, the received data set is organized as an InfoTable.

The method 1200 includes displaying one or more selected rendering widgets including data content sources (step 1208). The selected rendering widgets correspond to a selected level of the input widget, for example, as described in more detail with reference to FIG. 6.

Figure 13:
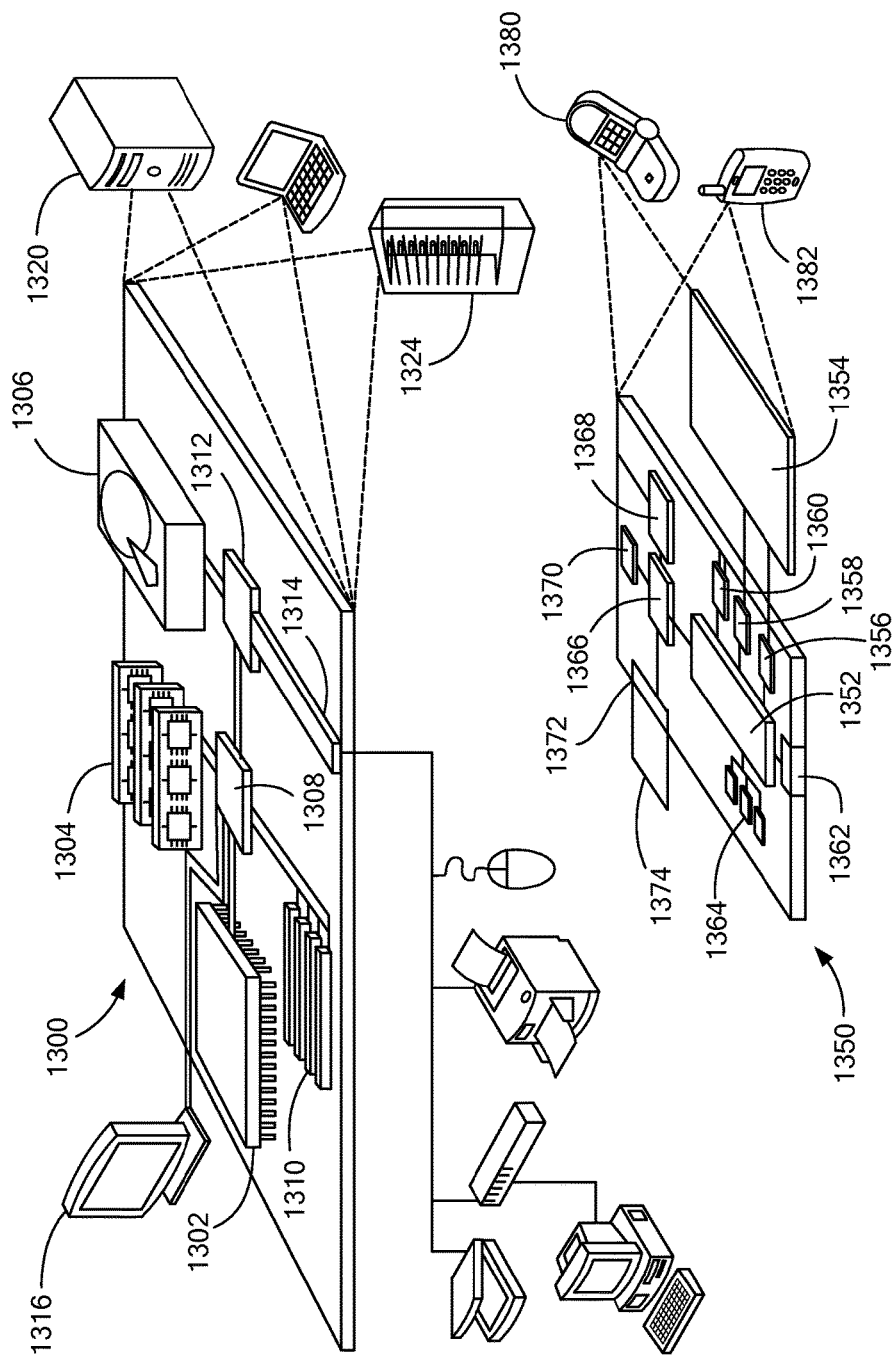
FIG. 13 is a block diagram of a computing device and a mobile computing device.

FIG. 13 shows an example of a computing device 1300 and a mobile computing device 1350 that can be used to implement the techniques described in this disclosure. The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302).

The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementations, the low-speed interface 1312 is coupled to the storage device 1306 and the low-speed expansion port 1314. The low-speed expansion port 1314, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may contain one or more of the computing device 1300 and the mobile computing device 1350, and an entire system may be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1350, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry where necessary. The communication interface 1366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1368 using a radio-frequency. In addition, short-range communication may occur, such as using a Bluetooth®, Wi-Fi™, or other such transceiver (not shown). In addition, a GPS (Global Positioning System) receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1360, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser (e.g., embedded web browser frame), or the like, through which a user can interact with an implementations of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, systems and methods for developing real-time Web applications for multiple platforms in a heterogeneous environment are provided are provided. Having described certain implementations of methods and apparatus of developing real-time Web applications, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A computer-implemented method for operating a real-time Web application, the computer-implemented method comprising:
   providing, at a client-side application executing on a computing device, a graphical user interface comprising one or more rendering widgets for presentation of data associated with a plurality of second computing devices,
      wherein the client-side application is defined by a plurality of application definition files having instructions to invoke a plurality of Web service objects, and
      wherein the instructions, during runtime, cause retrieval of data from one or more storage computing devices for presentation on the one or more rendering widgets;
   receiving, by the client-side application, from the one or more storage computing devices, one or more datasets corresponding to the invoked Web service objects;
   responsive to receipt of the one or more datasets, caching, by the client-side application, each of the received one or more datasets;
   responsive to the received one or more datasets being cached, presenting, by the client-side application, data of the cached one or more datasets via the one or more rendering widgets;
   receiving, by the client-side application, a manifest file listing one or more updated application definition files having second instructions to invoke a second plurality of plurality of Web service objects;
   responsive to receipt of the manifest file, retrieving, by the client-side application, the one or more updated application definition files listed in the manifest file;
   responsive to receipt of the one or more updated application definition files, caching, by the client-side application, each of the received one or more updated application definition files; and
   responsive to the received one or more updated application definition files being cached, updating, by the client-side application, the plurality of application definition files with the cached one or more updated application definition files.

2. The computer-implemented method of claim 1, wherein the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

3. The computer-implemented method of claim 2, wherein a multi-level dataset of the one or more multi-level datasets is received in two or more data streams.

4. The computer-implemented method of claim 1, wherein the graphical user interface comprises an input widget for selection of data for the presentation via the one or more rendering widgets, wherein the input widget comprises a plurality of selectable elements, and wherein a first set of selectable elements of the input widget is associated with individual monitored assets of the plurality of second computing devices and a second set of selectable elements of the input widget is associated with groups of monitored assets.

5. The computer-implemented method of claim 4, wherein the input widget is presented as a tree diagram.

6. The computer-implemented method of claim 1, comprising:
   storing, by the client-side application, the data of the one or more rendering widgets in persistent memory.

7. The computer-implemented method of claim 1, wherein the step of updating comprises storing the cached one or more updated application definition files in persistent memory.

8. The computer-implemented method of claim 1, wherein the step of updating is performed in a transactional manner.

9. The computer-implemented method of claim 1, wherein the client-side application is configured to continue to present data of the cached one or more datasets via the one or more rendering widgets when connectivity to the one or more storage computing devices is intermittent and/or sporadic.

10. A system comprising:
   a processor and a memory having instructions stored therein, wherein the instructions, when executed by the processor, cause the processor to:
   provide a graphical user interface of a client-side application, the graphical user interface comprising one or more rendering widgets for presentation of data associated with a plurality of monitored assets,
      wherein the client-side application is defined by a plurality of application definition files having a set of instructions to invoke a plurality of Web service objects, and
      wherein the set of instructions, during runtime, cause retrieval of data from one or more storage computing devices for presentation on the one or more rendering widgets;
   receive one or more datasets corresponding to the invoked Web service objects;
   responsive to receipt of the one or more datasets, caching each of the received one or more datasets; and
   responsive to the received one or more datasets being cached, present data of the cached one or more datasets via the one or more rendering widgets;
   receive a manifest file listing one or more updated application definition files having second instructions to invoke a second plurality of plurality of Web service objects;
   responsive to receipt of the one or more manifest file, retrieve the one or more updated application definition files listed in the manifest file;
   responsive to receipt of the one or more updated application definition files, cache each of the received one or more updated application definition files; and
   responsive to the received one or more updated application definition files being cached, update the plurality of application definition files with the cached one or more updated application definition files.

11. The system of claim 10, wherein the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

12. The system of claim 11, wherein a multi-level dataset of the one or more multi-level datasets is received in two or more data streams.

13. The system of claim 10, wherein the graphical user interface comprises an input widget for selection of data for the presentation via the one or more rendering widgets, wherein the input widget comprises a plurality of inputs, and wherein a first set of inputs of the input widget is associated with individual computing devices of the plurality of computing devices and a second set of inputs of the input widget is associated with groups of computing devices of the plurality of computing devices.

14. The system of claim 13, wherein the input widget is presented as a tree diagram.

15. The system of claim 10, wherein the instructions, when executed by the processor, cause the processor to:
store the data of the one or more rendering widgets in persistent memory.

16. The system of claim 10, wherein the instructions, when executed by the processor, cause the processor to store the updated application definition files in persistent memory following the update of the plurality of application files.

17. The system of claim 10, wherein the client-side application is configured to continue to present data of the cached one or more datasets via the one or more rendering widgets when connectivity to the one or more storage computing devices is intermittent and/or sporadic.

18. A non-transitory computer readable medium having instructions stored thereon, wherein the instructions, when executed by a processor, cause the processor to:
provide a graphical user interface of a client-side application, the graphical user interface comprising one or more rendering widgets for presentation of data associated with a plurality of computing devices, wherein the client-side application is defined by a plurality of application definition files having a set of instructions to invoke a plurality of Web service objects, and wherein the set of instructions, during runtime, cause retrieval of data from one or more storage computing devices for presentation on the one or more rendering widgets;
receive one or more datasets corresponding to the invoked Web service objects;
responsive to receipt of the one or more datasets, caching each of the received one or more datasets;
responsive to the received one or more datasets being cached, present data of the cached one or more datasets via the one or more rendering widgets;
receive a manifest file listing one or more updated application definition files having second instructions to invoke a second plurality of plurality of Web service objects;
responsive to receipt of the one or more manifest file, retrieve the one or more updated application definition files listed in the manifest file;
responsive to receipt of the one or more updated application definition files, cache each of the received one or more updated application definition files; and
responsive to the received one or more updated application definition files being cached, update the plurality of application definition files with the cached one or more updated application definition files.

19. The computer readable medium of claim 18, wherein the received one or more datasets comprise one or more multi-level datasets, wherein each multi-level dataset of the one or more multi-level datasets is organized in a hierarchical structure, wherein one or more levels of the multi-level dataset are organized based on members selected from the group consisting of a geographic area, a geographic site, a geographic region, a company subdivision, and a company.

20. The computer readable medium of claim 18, wherein the client-side application is configured to continue to present data of the cached one or more datasets via the one or more rendering widgets when connectivity to the one or more storage computing devices is intermittent and/or sporadic.

* * * * *